United States Patent
Aflaki Beni et al.

(10) Patent No.: US 10,368,097 B2
(45) Date of Patent: Jul. 30, 2019

(54) APPARATUS, A METHOD AND A COMPUTER PROGRAM PRODUCT FOR CODING AND DECODING CHROMA COMPONENTS OF TEXTURE PICTURES FOR SAMPLE PREDICTION OF DEPTH PICTURES

(71) Applicant: Nokia Technologies Oy, Espoo (FI)

(72) Inventors: Payman Aflaki Beni, Espoo (FI); Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 459 days.

(21) Appl. No.: 14/590,725

(22) Filed: Jan. 6, 2015

(65) Prior Publication Data

US 2015/0195573 A1    Jul. 9, 2015

Related U.S. Application Data

(60) Provisional application No. 61/924,404, filed on Jan. 7, 2014.

(51) Int. Cl.
*H04N 19/597* (2014.01)
*H04N 19/513* (2014.01)

(52) U.S. Cl.
CPC ......... *H04N 19/597* (2014.11); *H04N 19/513* (2014.11)

(58) Field of Classification Search
CPC .......................... H04N 19/597; H04N 19/513
See application file for complete search history.

(56) References Cited

U.S. PATENT DOCUMENTS 6,999,620 B1 *  2/2006  Harville ............. G06K 9/00362
                                                       382/103
10,063,886 B2 *  8/2018  Ye ......................... H04N 19/597
(Continued)

FOREIGN PATENT DOCUMENTS

WO    2013/068566 A1    5/2013

OTHER PUBLICATIONS

P. Merkle, Y. Morvan, A. Smolic, D. Farin, K. Mailer, P.H.N. de With, T. Wiegand, The effects of multiview depth video compression on multiview rendering, Signal Processing: Image Communication, vol. 24, Issues 1-2, Jan. 2009, pp. 73-88, ISSN 0923-5965, http://dx.doi.org/10.1016/j.image.2008.10.010.*

(Continued)

*Primary Examiner* — Gims S Philippe
*Assistant Examiner* — Stefan Gadomski
(74) *Attorney, Agent, or Firm* — Alston & Bird LLP

(57) ABSTRACT

A method comprising decoding one or both chroma components of a coded texture picture into one or two decoded chroma sample arrays, obtaining a reference sample array on the basis of said one or two decoded chroma sample arrays, and forming a decoded depth view component on the basis of said reference sample array; encoding one or two chroma components of a texture picture into one or two coded chroma components and reconstructing one or two reconstructed chroma sample arrays, obtaining a reference sample array on the basis of said one or two reconstructed chroma sample arrays, and using the reference sample array as a reference for prediction in encoding of a depth view component.

18 Claims, 9 Drawing Sheets

(56) References Cited

U.S. PATENT DOCUMENTS

| | | | |
|---|---|---|---|
| 2005/0035974 A1* | 2/2005 | Nair | G09G 5/06 345/589 |
| 2007/0076922 A1* | 4/2007 | Living | G06K 9/00295 382/118 |
| 2008/0170803 A1* | 7/2008 | Forutanpour | G06T 3/4038 382/284 |
| 2008/0284878 A1* | 11/2008 | Kosakai | G06T 5/009 348/241 |
| 2011/0273529 A1* | 11/2011 | Lai | G06T 5/002 348/42 |
| 2012/0070102 A1* | 3/2012 | Yokokawa | H04N 5/23222 382/286 |
| 2012/0293603 A1* | 11/2012 | Wang | H04N 7/15 348/14.08 |
| 2012/0328188 A1* | 12/2012 | Park | G06K 9/3216 382/165 |
| 2013/0022120 A1* | 1/2013 | Gupte | H04N 19/176 375/240.16 |
| 2013/0028316 A1* | 1/2013 | Leontaris | H04N 19/597 375/240.03 |
| 2013/0034171 A1* | 2/2013 | Winken | H04N 19/597 375/240.25 |
| 2013/0051659 A1* | 2/2013 | Yamamoto | H04N 13/261 382/154 |
| 2013/0127989 A1* | 5/2013 | Chen | G06T 7/579 348/43 |
| 2013/0147915 A1* | 6/2013 | Wiegand | H04N 13/0048 348/43 |
| 2013/0259365 A1* | 10/2013 | Suzuki | G06K 9/4652 382/164 |
| 2013/0271565 A1* | 10/2013 | Chen | H04N 13/0048 348/43 |
| 2013/0271566 A1* | 10/2013 | Chen | H04N 13/0048 348/43 |
| 2013/0329008 A1* | 12/2013 | Takahashi | H04N 13/0048 348/43 |
| 2014/0064379 A1* | 3/2014 | Mrak | H04N 19/00775 375/240.18 |
| 2014/0153645 A1* | 6/2014 | Zhang | H04N 19/597 375/240.12 |
| 2014/0247871 A1* | 9/2014 | Merkle | H04N 19/00533 375/240.12 |
| 2014/0286433 A1* | 9/2014 | He | H04N 19/00696 375/240.16 |
| 2014/0293299 A1* | 10/2014 | Ozawa | H04N 1/40062 358/1.9 |
| 2014/0293380 A1* | 10/2014 | Hasegawa | H04N 1/56 358/505 |
| 2015/0019532 A1* | 1/2015 | Kim | G06F 17/30268 707/722 |
| 2015/0036744 A1* | 2/2015 | Sato | H04N 19/593 375/240.12 |
| 2015/0078447 A1* | 3/2015 | Gamei | H04N 19/122 375/240.12 |
| 2015/0085917 A1* | 3/2015 | Hendry | H04N 21/234 375/240.02 |
| 2015/0110174 A1* | 4/2015 | Gu | H04N 19/105 375/240.03 |
| 2015/0245061 A1* | 8/2015 | Chen | H04N 19/597 375/240.13 |

OTHER PUBLICATIONS

Wei Jing Chen, Jia Su, Bin Li and T. Ikenaga, "Reversed intra prediction based on chroma extraction in HEVC," 2011 International Symposium on Intelligent Signal Processing and Communications Systems (ISPACS), Chiang Mai, 2011, pp. 1-5. doi: 10.1109/ISPACS.2011.6146083.*

C. M. Fu et al., "Sample Adaptive Offset in the HEVC Standard," in IEEE Transactions on Circuits and Systems for Video Technology, vol. 22, No. 12, pp. 1755-1764, Dec. 2012. doi: 10.1109/TCSVT.2012.2221529.*

J. Y. Lee, H. C. Wey and D. S. Park, "A Fast and Efficient Multi-View Depth Image Coding Method Based on Temporal and Inter-View Correlations of Texture Images," in IEEE Transactions on Circuits and Systems for Video Technology, vol. 21, No. 12, pp. 1859-1868, Dec. 2011. doi: 10.1109/TCSVT.2011.2154730.*

Fecker et al. "Histogram-Based Prefiltering for Luminance and Chrominance Compensation of Multiview Video" IEEE 2008.*

Felzenszwalb, P.F. & Huttenlocher, D.P. International Journal of Computer Vision (2004) 59: 167. https://doi.org/10.1023/B:VISI.0000022288.19776.77 (Year: 2004).*

P. Zanuttigh and G. M. Cortelazzo, "Compression of depth information for 3D rendering," nbsp;2009 3DTV Conference: The True Vision—Capture, Transmission and Display of 3D Video, Potsdam, 2009, pp. 1-4.doi: 10.1109/3DTV.2009.5069669 (Year: 2009).*

Jan Hanca, Adrian Munteanu, and Peter Schelkens "Lossy contour-coding in segmentation-based intra-depth map coding", Proc. SPIE 8650, Three-Dimensional Image Processing (3DIP) and Applications 2013, 865009 (Mar. 12, 2013); doi: 10.1117/12.2002106; https://doi.org/10.1117/12.2002106 (Year: 2013).*

International Search Report and Written Opinion received for corresponding Patent Cooperation Treaty Application No. PCT/FI2015/050005, dated Apr. 22, 2015, 13 pages.

Hanca et al., "Segmentation-Based Intra Coding of Depth Maps Using Texture Information", 18th International Conference on Digital Signal Processing, Jul. 1-3, 2013, 6 pages.

McMillan, "An Image-Based Approach to Three-Dimensional Computer Graphics", Doctoral Dissertation, 1997, 206 pages.

Mark, "Post-Rendering 3d Image Warping: Visibility, Reconstruction, and Performance for Depth-Image Warping", Thesis, TR99-022, Apr. 21, 1999, 227 pages.

Jager, "Contour-Based Segmentation and Coding for Depth Map Compression", IEEE Visual Communications and Image Processing, Nov. 6-9, 2011, 4 Pages.

Howard et al., "The Emerging JBIG2 Standard", IEEE Transactions on Circuits and Systems for Video Technology, vol. 8, Issue: 7, Nov. 1998, pp. 838-848.

"Advanced Video Coding for Generic Audiovisual Services", Series H: Audiovisual and Multimedia Systems, Infrastructure of audiovisual services—Coding of moving video, Recommendation ITU-T H.264, Mar. 2010, 676 pages.

"High Efficiency Video Coding", Series H: Audiovisual and Multimedia Systems, Infrastructure of audiovisual services—Coding of moving video, Recommendation ITU-T H.265, Apr. 2013, 317 pages.

"Parameter Values for the HDTV Standards for Production and International Programme Exchange", Recommendation ITU-R BT.709-5, Apr. 2002, 32 pages.

"Parameter Values for Ultra-High Definition Television Systems for Production and International Programme Exchange", Recommendation ITU-R BT.2020, Aug. 2012, 7 pages.

Segall A. et al. Joint Video Team (JVT) of ISO/IEC MPEG & ITU T VCEG (ISO/IEC JTC1/SC29/WG11 and ITU-TSG 16 Q6), 21st Meeting Hangzhou, China Oct. 20-27, 2006, 8 pages.

"Coding of Moving Pictures and Audio", International Orgainization for Standardisation, ISO/IEC JTC1/SC29/WG11/N5540, Mar. 2003, Pattaya, 14 pages.

* cited by examiner

APPARATUS, A METHOD AND A COMPUTER PROGRAM PRODUCT FOR CODING AND DECODING CHROMA COMPONENTS OF TEXTURE PICTURES FOR SAMPLE PREDICTION OF DEPTH PICTURES

TECHNICAL FIELD

The present invention relates to an apparatus, a method and a computer program for video coding and decoding.

BACKGROUND

In most video codecs the input video has YUV format. YUV is basically a raw uncompressed data video format which is a collection of raw pixel values in YUV color space. YUV video is composed of three components, namely one luminance (luma), i.e. Y, and two chrominance (chroma), i.e. U, V.

Considering the nature of luma and chroma components, and based on the fact that all components are presenting the same scene, there is often a high correlation between the content of different components e.g. several edges and contours are similar. However, if there is not a distinct color difference on the same object in the scene, then there is no contour present in the chroma components while there can be details and contours present on the same object in the luma component.

In conventional presentation of multiview video plus depth (MVD), each texture view is accompanied with an associated depth map. However, it may not be necessary to always use all available depth maps in the post processing steps e.g. view synthesis. This is attributed to the fact that the depth map information might be redundant and highly correlated and hence, it might be possible to create part of them from the already decoded depth maps. This will make it possible to provide the middle view depth map with a relatively lower spatial resolution targeting less bitrate and complexity while exploiting it for more efficient texture view compression.

It is known that motion vectors can be predicted or inherited from a texture picture to a depth picture or vice versa, particularly when the pictures represent the same viewpoint or camera position. However, since sufficient correlation between the sample values of the texture picture and the respective depth picture has been difficult to find, sample value prediction from a texture picture to a depth picture has not been proposed. Consequently, the compression benefit achievable from inter-component prediction (from texture to depth or vice versa) has been limited.

SUMMARY

Now in order to at least alleviate the above problems, a method for deriving sample value prediction from a texture picture to a depth picture is introduced herein.

A method according to a first embodiment comprises decoding one or both chroma components of a coded texture picture into one or two decoded chroma sample arrays;

obtaining a reference sample array on the basis of said one or two decoded chroma sample arrays; and forming a decoded depth view component on the basis of said reference sample array.

According to an embodiment, the method further comprises using one of said decoded chroma sample arrays as the reference sample array.

According to an embodiment, the method further comprises using a bi-directional prediction of said decoded chroma sample arrays as the reference sample array.

According to an embodiment, the method further comprises modifying said one or two decoded chroma sample arrays in order to obtain the reference sample array.

According to an embodiment, said modifying comprises quantizating sample values of said one or two decoded chroma sample arrays.

According to an embodiment, using a predefined weighted prediction method for said sample value quantization.

According to an embodiment, said modifying comprises
segmenting said one or two decoded chroma sample arrays; and
replacing the sample values in each segment by a representative value of said each segment.

According to an embodiment, said modifying comprises
partitioning said one or two decoded chroma sample arrays into blocks to be filtered;
deriving bands of sample values to be filtered for each block;
decoding an offset for each band and each block to be filtered; and
summing each sample value of a block to be filtered and the offset for the band for said each sample value.

According to an embodiment, the method further comprises
using one of said modified chroma sample arrays as a monochrome picture to be used as a reference for sample prediction of the depth view.

According to an embodiment, the method further comprises
using both of said modified chroma sample arrays as monochrome pictures to be used as a reference for sample prediction of the depth view.

According to an embodiment, the method further comprises
including a picture containing a processed chroma sample array in a reference picture list more than once with different associated weighting parameters.

An apparatus according to a second embodiment comprises:

at least one processor and at least one memory, said at least one memory stored with code thereon, which when executed by said at least one processor, causes an apparatus to perform at least decoding one or both chroma components of a coded texture picture into one or two decoded chroma sample arrays;

obtaining a reference sample array on the basis of said one or two decoded chroma sample arrays; and forming a decoded depth view component on the basis of said reference sample array.

According to a third embodiment there is provided a computer readable storage medium stored with code thereon for use by an apparatus, which when executed by a processor, causes the apparatus to perform:

decoding one or both chroma components of a coded texture picture into one or two decoded chroma sample arrays;

obtaining a reference sample array on the basis of said one or two decoded chroma sample arrays; and forming a decoded depth view component on the basis of said reference sample array.

According to a fourth embodiment there is provided an apparatus comprising a video decoder configured for decoding a bitstream comprising an image sequence, the video decoder comprising means decoding one or both chroma components of a coded texture picture into one or two decoded chroma sample arrays;

means for obtaining a reference sample array on the basis of said one or two decoded chroma sample arrays; and means for forming a decoded depth view component on the basis of said reference sample array.

According to a fifth embodiment there is provided a video decoder configured for decoding a bitstream comprising an image sequence, wherein said video decoder is further configured for:

decoding one or both chroma components of a coded texture picture into one or two decoded chroma sample arrays;

obtaining a reference sample array on the basis of said one or two decoded chroma sample arrays; and forming a decoded depth view component on the basis of said reference sample array.

A method according to a sixth embodiment comprises encoding one or two chroma components of a texture picture into one or two coded chroma components and reconstructing one or two reconstructed chroma sample arrays;

obtaining a reference sample array on the basis of said one or two reconstructed chroma sample arrays; and using the reference sample array as a reference for prediction in encoding of a depth view component.

According to an embodiment, the method further comprises forming a reconstructed depth view component.

According to an embodiment, the method further comprises using one of said reconstructed chroma sample arrays as the reference sample array.

According to an embodiment, the method further comprises using a bi-directional prediction of said reconstructed chroma sample arrays as the reference sample array.

According to an embodiment, the method further comprises modifying said one or two reconstructed chroma sample arrays in order to obtain the reference sample array.

According to an embodiment, said modifying comprises quantizating sample values of said one or two reconstructed chroma sample arrays.

According to an embodiment, using a predefined weighted prediction method for said sample value quantization.

According to an embodiment, said modifying comprises partitioning said one or two reconstructed chroma sample arrays into blocks to be filtered;

deriving bands of sample values to be filtered for each block;

decoding an offset for each band and each block to be filtered; and summing each sample value of a block to be filtered and the offset for the band for said each sample value.

According to an embodiment, the method further comprises using one of said modified chroma sample arrays as a monochrome picture to be used as a reference for sample prediction of the depth view.

According to an embodiment, the method further comprises using both of said modified chroma sample arrays as monochrome pictures to be used as a reference for sample prediction of the depth view.

According to an embodiment, the method further comprises including a picture containing a processed chroma sample array in a reference picture list more than once with different associated weighting parameters.

An apparatus according to a seventh embodiment comprises:

at least one processor and at least one memory, said at least one memory stored with code thereon, which when executed by said at least one processor, causes an apparatus to perform at least encoding one or two chroma components of a texture picture into one or two coded chroma components and reconstructing one or two reconstructed chroma sample arrays;

obtaining a reference sample array on the basis of said one or two reconstructed chroma sample arrays; and using the reference sample array as a reference for prediction in encoding of a depth view component.

According to an eighth embodiment there is provided a computer readable storage medium stored with code thereon for use by an apparatus, which when executed by a processor, causes the apparatus to perform:

encoding one or two chroma components of a texture picture into one or two coded chroma components and reconstructing one or two reconstructed chroma sample arrays;

obtaining a reference sample array on the basis of said one or two reconstructed chroma sample arrays; and using the reference sample array as a reference for prediction in encoding of a depth view component.

According to a ninth embodiment there is provided an apparatus comprising a video encoder configured for encoding a bitstream comprising an image sequence, the video encoder comprising means for encoding one or two chroma components of a texture picture into one or two coded chroma components and reconstructing one or two reconstructed chroma sample arrays;

means for obtaining a reference sample array on the basis of said one or two reconstructed chroma sample arrays; and means for using the reference sample array as a reference for prediction in encoding of a depth view component.

According to a tenth embodiment there is provided a video encoder configured for encoding a bitstream comprising an image sequence, wherein said video encoder is further configured for:

encoding one or two chroma components of a texture picture into one or two coded chroma components and reconstructing one or two reconstructed chroma sample arrays;

obtaining a reference sample array on the basis of said one or two reconstructed chroma sample arrays; and using the reference sample array as a reference for prediction in encoding of a depth view component.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
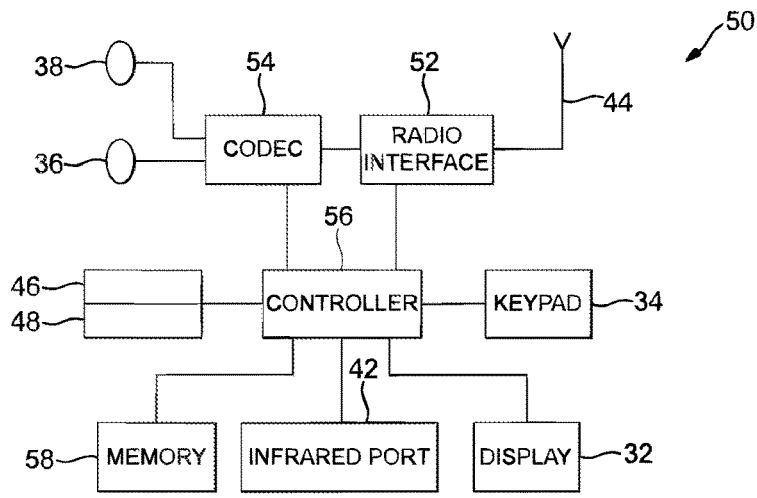
FIG. 1 shows schematically an electronic device employing some embodiments of the invention.
Figure 2:
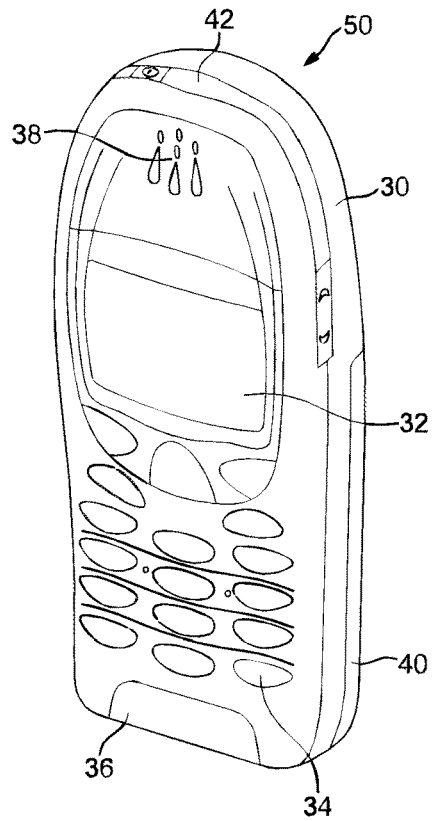
FIG. 2 shows schematically a user equipment suitable for employing some embodiments of the invention.

The following describes in further detail suitable apparatus and possible mechanisms for encoding an enhancement layer sub-picture without significantly sacrificing the coding efficiency. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 3:
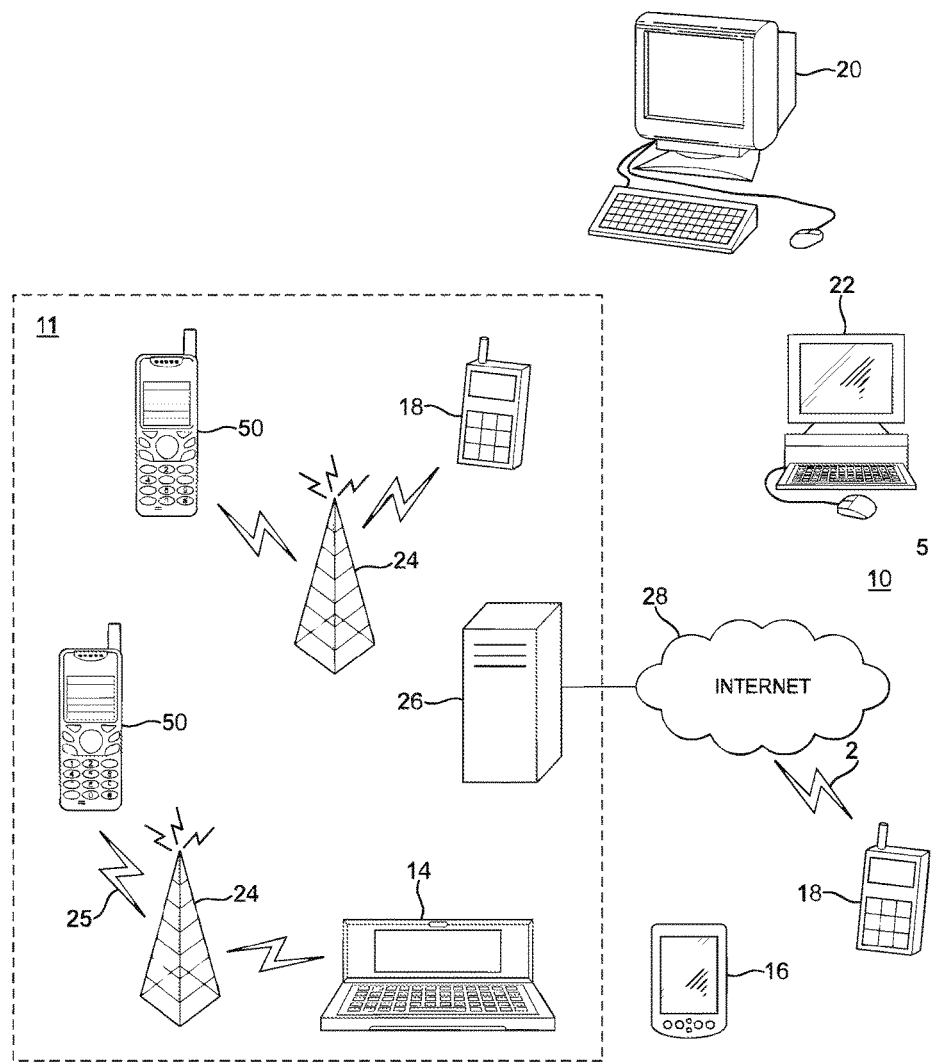
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Video codec consists of an encoder that transforms the input video into a compressed representation suited for storage/transmission and a decoder that can uncompress the compressed video representation back into a viewable form. Typically encoder discards some information in the original video sequence in order to represent the video in a more compact form (that is, at lower bitrate).

Typical hybrid video codecs, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
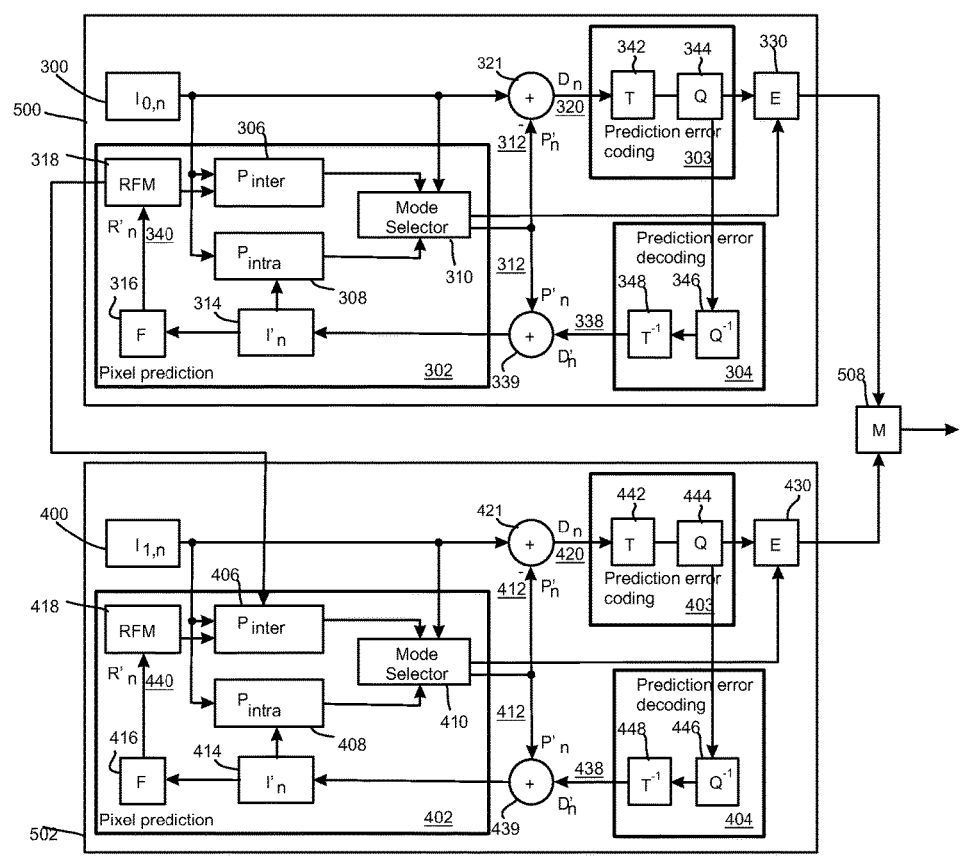
FIG. 4 shows schematically an encoder suitable for implementing some embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

The High Efficiency Video Coding (H.265/HEVC) standard was developed by the Joint Collaborative Team-Video Coding (JCT-VC) of VCEG and MPEG. The standard is or will be published by both parent standardization organizations, and it is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions, which may be abbreviated SHVC, MV-HEVC, 3D-HEVC, and REXT, respectively.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

The directionality of a prediction mode for intra prediction, i.e. the prediction direction to be applied in a particular prediction mode, may be vertical, horizontal, diagonal. For example, in HEVC, intra prediction provides up to 33 directional prediction modes, depending on the size of PUs, and each of the intra prediction modes has a prediction direction assigned to it.

Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

Figure 5:
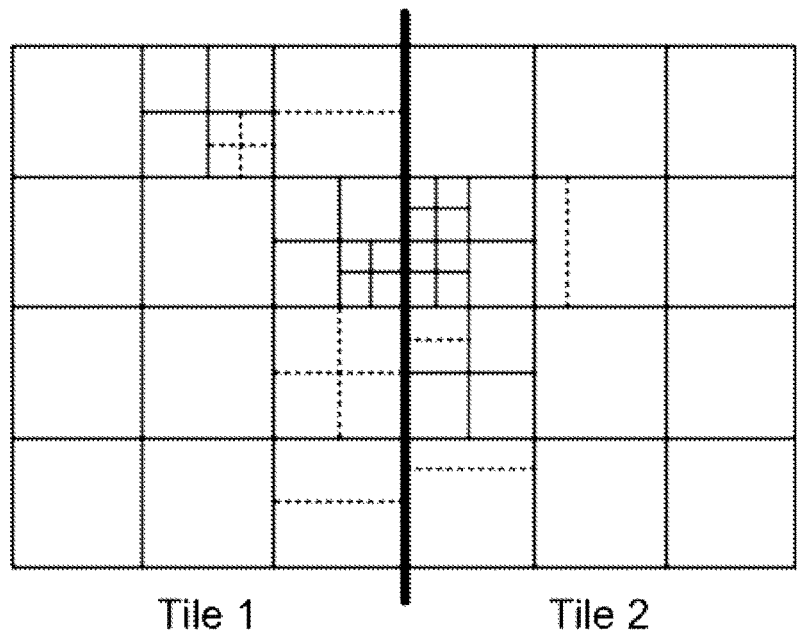
FIG. 5 shows an example of a picture consisting of two tiles.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In a draft HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order. FIG. 5 shows an example of a picture consisting of two tiles partitioned into square coding units (solid lines) which have been further partitioned into rectangular prediction units (dashed lines).

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

In SAO, a picture is divided into regions where a separate SAO decision is made for each region. The SAO information in a region is encapsulated in a SAO parameters adaptation unit (SAO unit) and in HEVC, the basic unit for adapting SAO parameters is CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in some embodiments divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. The five categories are described as follows:

1. Current sample value is smaller than the two neighbour samples
2. Current sample value is smaller than one of the neighbors and equal to the other neighbor
3. Current sample value is greater than one of the neighbors and equal to the other neighbor
4. Current sample value is greater than two neighbour samples
5. None of the above These five categories are not required to be signalled to the decoder because the classification is based on only reconstructed samples, which may be available and identical in both the encoder and decoder. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The SAO parameters may be signalled as interleaved in CTU data. Above CTU, slice header contains a syntax element specifying whether SAO is used in the slice. If SAO is used, then two additional syntax elements specify whether SAO is applied to Cb and Cr components. For each CTU, there are three options: 1) copying SAO parameters from the left CTU, 2) copying SAO parameters from the above CTU, or 3) signalling new SAO parameters.

The adaptive loop filter (ALF) is another method to enhance quality of the reconstructed samples. This may be achieved by filtering the sample values in the loop. In some embodiments the encoder determines which region of the pictures are to be filtered and the filter coefficients based on e.g. RDO and this information is signalled to the decoder.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+ \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit. In H.264/AVC, the NAL unit header indicates whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit reserved field (called nuh_layer_id). The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes.

The six-bit reserved field is expected to be used by extensions such as a future scalable and 3D video extension. It is expected that these six bits would carry information on the scalability hierarchy, such as quality_id or similar, dependency_id or similar, any other type of layer identifier, view order index or similar, view identifier, an identifier similar to priority_id of SVC indicating a valid sub-bitstream extraction if all NAL units greater than a specific identifier value are removed from the bitstream. Without loss of generality, in some example embodiments a variable LayerId is derived from the value of reserved_zero_6 bits for example as follows: LayerId=reserved_zero_6 bits.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP (a.k.a. IDR_W_RADL) BLA_N_LP | Coded slice segment of a BLA picture slice_segment_layer_rbsp( ) |
| 19, 20 | IDR_W_DLP (a.k.a. IDR_W_RADL) IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22 . . . RSV_IRAP_VCL23 | Reserved // reserved RAP VCL NAL unit types |
| 24 . . . 31 | RSV_VCL24 . . . RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In a draft HEVC standard, there was also a third type of parameter sets, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), adaptive sample offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS. In another draft HEVC standard, an APS syntax structure only contains ALF parameters. In a draft HEVC standard, an adaptation parameter set RBSP includes parameters that can be referred to by the coded slice NAL units of one or more coded pictures when at least one of sample_adaptive_offset_enabled_flag or adaptive_loop_filter_enabled_flag are equal to 1. In the final published HEVC, the APS syntax structure was removed from the specification text.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain temporal_id values) of a layer representation.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. In a draft HEVC standard, a slice header additionally contains an APS identifier, although in the published HEVC standard the APS identifier was removed from the slice header. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Several nesting SEI messages have been specified in the AVC and HEVC standards or proposed otherwise. The idea of nesting SEI messages is to contain one or more SEI messages within a nesting SEI message and provide a mechanism for associating the contained SEI messages with a subset of the bitstream and/or a subset of decoded data. It may be required that a nesting SEI message contains one or more SEI messages that are not nesting SEI messages themselves. An SEI message contained in a nesting SEI message may be referred to as a nested SEI message. An SEI message not contained in a nesting SEI message may be referred to as a non-nested SEI message. The scalable nesting SEI message of HEVC enables to identify either a bitstream subset (resulting from a sub-bitstream extraction process) or a set of layers to which the nested SEI messages apply. A bitstream subset may also be referred to as a sub-bitstream.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit (AU) comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain one or more coded pictures with different values of nuh_layer_id. In addition to containing the VCL NAL units of the coded picture, an access unit may also contain non-VCL NAL units.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be an IDR access unit, a BLA access unit, or a CRA access unit. The value of NoRaslOutputFlag is equal to 1 for each IDR access unit, each BLA access unit, and each CRA access unit that is the first access unit in the bitstream in decoding order, is the first access unit that follows an end of sequence NAL unit in decoding order, or has HandleCraAsBlaFlag equal to 1. NoRaslOutputFlag equal to 1 has an impact that the RASL pictures associated with the IRAP picture for which the NoRaslOutputFlag is set are not output by the decoder. HandleCraAsBlaFlag may be set to 1 for example by a player that seeks to a new position in a bitstream or tunes into a broadcast and starts decoding and then starts decoding from a CRA picture.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, can be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may be considered to start from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) is constructed after the final reference picture lists (List 0 and List 1) have been constructed. The combined list may be used for uni-prediction (also known as uni-directional prediction) within B slices. In the published HEVC standard, the combined list was removed.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Figure 6:
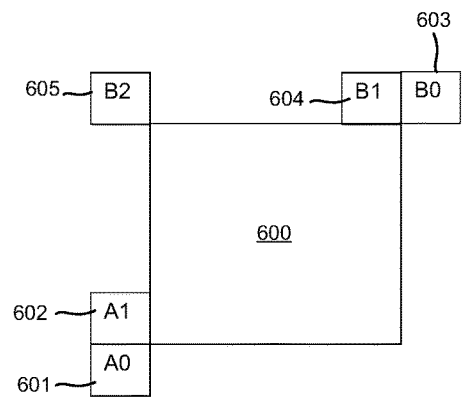
FIG. 6 shows an example of a current block and five spatial neighbors usable as motion prediction candidates.

The advanced motion vector prediction (AMVP) or alike may operate for example as follows, while other similar realizations of advanced motion vector prediction are also possible for example with different candidate position sets and candidate locations with candidate position sets. Two spatial motion vector predictors (MVPs) may be derived and a temporal motion vector predictor (TMVP) may be derived. They may be selected among the positions shown in FIG. 6: three spatial motion vector predictor candidate positions 603, 604, 605 located above the current prediction block 600 (B0, B1, B2) and two 601, 602 on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for the temporal motion vector predictor may be indicated by the encoder in the slice header (e.g. as a collocated_ref_idx syntax element). The motion vector obtained from the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate.

Many high efficiency video codecs such as HEVC codec employ an additional motion information coding/decoding mechanism, often called merging/merge mode/process/mechanism, where all the motion information of a block/PU is predicted and used without any modification/correction. The aforementioned motion information for a PU may comprise one or more of the following: 1) The information whether 'the PU is uni-predicted using only reference picture list0' or 'the PU is uni-predicted using only reference picture list1' or 'the PU is bi-predicted using both reference picture list0 and list 1'; 2) Motion vector value corresponding to the reference picture list0, which may comprise a horizontal and vertical motion vector component; 3) Reference picture index in the reference picture list0 and/or an identifier of a reference picture pointed to by the motion vector corresponding to reference picture list0, where the identifier of a reference picture may be for example a picture order count value, a layer identifier value (for inter-layer prediction), or a pair of a picture order count value and a layer identifier value; 4) Information of the reference picture marking of the reference picture, e.g. information whether the reference picture was marked as "used for short-term reference" or "used for long-term reference"; 5)-7) The same as 2)-4), respectively, but for reference picture list 1. Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

One of the candidates in the merge list may be a TMVP candidate, which may be derived from the collocated block within an indicated or inferred reference picture, such as the reference picture indicated for example in the slice header for example using the collocated_ref_idx syntax element or alike In HEVC the so-called target reference index for temporal motion vector prediction in the merge list is set as 0 when the motion coding mode is the merge mode. When the motion coding mode in HEVC utilizing the temporal motion vector prediction is the advanced motion vector prediction mode, the target reference index values are explicitly indicated (e.g. per each PU).

When the target reference index value has been determined, the motion vector value of the temporal motion vector prediction may be derived as follows: Motion vector at the block that is co-located with the bottom-right neighbor of the current prediction unit is calculated. The picture where the co-located block resides may be e.g. determined according to the signalled reference index in the slice header as described above. The determined motion vector at the co-located block is scaled with respect to the ratio of a first picture order count difference and a second picture order count difference. The first picture order count difference is derived between the picture containing the co-located block and the reference picture of the motion vector of the co-located block. The second picture order count difference is derived between the current picture and the target reference picture. If one but not both of the target reference picture and the reference picture of the motion vector of the co-located block is a long-term reference picture (while the other is a short-term reference picture), the TMVP candidate may be considered unavailable. If both of the target reference picture and the reference picture of the motion vector of the co-located block are long-term reference pictures, no POC-based motion vector scaling may be applied.

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Some coding standards allow creation of scalable bit streams. A meaningful decoded representation can be produced by decoding only certain parts of a scalable bit stream. Scalable bit streams can be used for example for rate adaptation of pre-encoded unicast streams in a streaming server and for transmission of a single bit stream to terminals having different capabilities and/or with different network conditions. A list of some other use cases for scalable video coding can be found in the ISO/IEC JTC1 SC29 WG11 (MPEG) output document N5540, "Applications and Requirements for Scalable Video Coding", the $64^{th}$ MPEG meeting, Mar. 10 to 14, 2003, Pattaya, Thailand.

A coding standard may include a sub-bitstream extraction process, and such is specified for example in SVC, MVC, and HEVC. The sub-bitstream extraction process relates to converting a bitstream, typically by removing NAL units, to a sub-bitstream, which may also be referred to as a bitstream subset. The sub-bitstream still remains conforming to the standard. For example, in HEVC, the bitstream created by excluding all VCL NAL units having a TemporalId value greater than a selected value and including all other VCL NAL units remains conforming. In HEVC, the sub-bitstream extraction process takes a TemporalId and/or a list of nuh_layer_id values as input and derives a sub-bitstream (also known as a bitstream subset) by removing from the bitstream all NAL units with TemporalId greater than the input TemporalId value or nuh_layer_id value not among the values in the input list of nuh_layer_id values.

A coding standard or system may refer to a term operation point or alike, which may indicate the scalable layers and/or sub-layers under which the decoding operates and/or may be associated with a sub-bitstream that includes the scalable layers and/or sub-layers being decoded. Some non-limiting definitions of an operation point are provided in the following.

In HEVC, an operation point is defined as bitstream created from another bitstream by operation of the sub-bitstream extraction process with the another bitstream, a target highest TemporalId, and a target layer identifier list as inputs.

In SHVC and MV-HEVC, an operation point definition may include a consideration a target output layer set. In SHVC and MV-HEVC, an operation point may be defined as A bitstream that is created from another bitstream by operation of the sub-bitstream extraction process with the another bitstream, a target highest TemporalId, and a target layer identifier list as inputs, and that is associated with a set of target output layers.

In MVC, an operation point may be defined as follows: An operation point is identified by a temporal_id value representing the target temporal level and a set of view_id values representing the target output views. One operation point is associated with a bitstream subset, which consists of the target output views and all other views the target output views depend on, that is derived using the sub-bitstream extraction process with tIdTarget equal to the temporal_id value and viewIdTargetList consisting of the set of view_id values as inputs. More than one operation point may be associated with the same bitstream subset. When "an operation point is decoded", a bitstream subset corresponding to the operation point may be decoded and subsequently the target output views may be output.

As indicated earlier, MVC is an extension of H.264/AVC. Many of the definitions, concepts, syntax structures, semantics, and decoding processes of H.264/AVC apply also to MVC as such or with certain generalizations or constraints. Some definitions, concepts, syntax structures, semantics, and decoding processes of MVC are described in the following.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit results in one decoded picture consisting of one or more decoded view components, when decoding errors, bitstream errors or other errors which may affect the decoding do not occur. In other words, an access unit in MVC contains the view components of the views for one output time instance.

A view component may be referred to as a coded representation of a view in a single access unit.

Inter-view prediction may be used in MVC and may refer to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

In the context of multiview video coding, view order index may be defined as an index that indicates the decoding or bitstream order of view components in an access unit. In MVC, the inter-view dependency relationships are indicated in a sequence parameter set MVC extension, which is included in a sequence parameter set. According to the MVC standard, all sequence parameter set MVC extensions that are referred to by a coded video sequence are required to be identical.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, block partitioning, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

The scalability structure in SVC may be characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL−1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVC standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_refactive_lx_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

A scalable video codec for quality scalability (also known as Signal-to-Noise or SNR) and/or spatial scalability may be implemented as follows. For a base layer, a conventional non-scalable video encoder and decoder are used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use typically with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

In addition to quality scalability following scalability modes exist:

Spatial scalability: Base layer pictures are coded at a higher resolution than enhancement layer pictures.

Bit-depth scalability: Base layer pictures are coded at lower bit-depth (e.g. 8 bits) than enhancement layer pictures (e.g. 10 or 12 bits).

Chroma format scalability: Base layer pictures provide lower fidelity in chroma (e.g. coded in 4:2:0 chroma format) than enhancement layer pictures (e.g. 4:4:4 format).

Color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut.

In all of the above scalability cases, base layer information could be used to code enhancement layer to minimize the additional bitrate overhead.

Another categorization of scalable coding is based on whether the same or different coding standard or technology is used as the basis for the base layer and enhancement layers. Terms hybrid codec scalability or standards scalability may be used to indicate a scenario where one coding standard or system is used for some layers, while another coding standard or system is used for some other layers. For example, the base layer may be AVC-coded, while one or more enhancement layers may be coded with an HEVC extension, such as SHVC or MV-HEVC.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame based scalability, approach can be implemented very efficiently with minimal changes to single layer codecs while still achieving majority of the coding efficiency gains available. It may be possible to implement a reference frame based scalability codec by utilizing the same hardware or software implementation for all the layers.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

A scalable video encoder e.g. for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

Work is ongoing to specify scalable and multiview extensions to the HEVC standard. The multiview extension of HEVC, referred to as MV-HEVC, is similar to the MVC extension of H.264/AVC. Similarly to MVC, in MV-HEVC, inter-view reference pictures can be included in the reference picture list(s) of the current picture being coded or decoded. The scalable extension of HEVC, referred to as SHVC, is planned to be specified so that it uses multi-loop decoding operation (unlike the SVC extension of H.264/AVC). SHVC uses a reference index based design, where an inter-layer reference picture can be included in a one or more reference picture lists of the current picture being coded or decoded (as described above). In an earlier draft of SHVC another design was also investigated, which may be referred to as IntraBL or TextureRL, where a specific coding mode, e.g. in CU level, is used for using decoded/reconstructed sample values of a reference layer picture for prediction in an enhancement layer picture. The SHVC development has concentrated on development of spatial and coarse grain quality scalability.

It is possible to use many of the same syntax structures, semantics, and decoding processes for MV-HEVC and reference-index-based SHVC. Furthermore, it is possible to use the same syntax structures, semantics, and decoding processes for depth coding too. Hereafter, term scalable multiview extension of HEVC (SMV-HEVC) is used to refer to a coding process, a decoding process, syntax, and semantics where largely the same (de)coding tools are used regardless of the scalability type and where the reference index based approach without changes in the syntax, semantics, or decoding process below the slice header is used.

SMV-HEVC might not be limited to multiview, spatial, and coarse grain quality scalability but may also support other types of scalability, such as depth-enhanced video. For example, depth may be specified as another scalability dimension in SMV-HEVC.

In the present draft of MV-HEVC, auxiliary pictures may be encoded in a bitstream using auxiliary picture layers. An auxiliary picture layer is associated with its own scalability dimension value, AuxId (similarly to e.g. view order index). Layers with AuxId greater than 0 contain auxiliary pictures. A layer carries only one type of auxiliary pictures, and the type of auxiliary pictures included in a layer is indicated by its AuxId value. In other words, AuxId values are mapped to types of auxiliary pictures. For example, AuxId equal to 1 may indicate alpha planes and AuxId equal to 2 may indicate depth pictures. An auxiliary picture may be defined as a picture that has no normative effect on the decoding process of primary pictures. In other words, primary pictures (with AuxId equal to 0) do not predict from auxiliary pictures. An auxiliary picture may predict from a primary picture, although there may be constraints disallowing such prediction, for example based on the AuxId value. SEI messages may be used to convey more detailed characteristics of auxiliary picture layers, such as the depth range represented by a depth auxiliary layer. The present draft of MV-HEVC includes support of depth auxiliary layers.

For the enhancement layer coding, the same concepts and coding tools of HEVC may be used in SHVC, MV-HEVC, and/or SMV-HEVC. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or SMV-HEVC codec.

An access unit in SHVC, MV-HEVC and SMV-HEVC may be defined as a set of NAL units that are associated with each other according to a specified classification rule, are consecutive in decoding order, and contain the VCL NAL units of all coded pictures associated with the same output time and their associated non-VCL NAL units.

In MV-HEVC, SMV-HEVC, and reference index based SHVC solution, the block level syntax and decoding process are not changed for supporting inter-layer texture prediction. Only the high-level syntax has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

The reference list(s) in MV-HEVC, SMV-HEVC, and a reference index based SHVC solution may be initialized using a specific process in which the inter-layer reference picture(s), if any, may be included in the initial reference picture list(s). A first example of constructing reference picture list(s) is provided in the following. For example, the temporal references may be firstly added into the reference lists (L0, L1) in the same manner as the reference list construction in HEVC. After that, the inter-layer references may be added after the temporal references. The inter-layer reference pictures may be for example concluded from the layer dependency information, which may be included in the VPS, for example. The inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists. For example, an opposite order of adding inter-layer reference pictures into the initial reference picture list 1 may be used compared to that of the initial reference picture list 0. For example, inter-layer reference pictures may be inserted into the initial reference picture 0 in an ascending order of nuh_layer_id, while an opposite order may be used to initialize the initial reference picture list 1.

A second example of constructing reference picture list(s) is provided in the following. Candidate inter-layer reference pictures may be for example concluded from the layer dependency information, which may be included in the VPS, for example. The encoder may include picture-level information in a bitstream and the decoder may decode picture-level information from the bitstream which ones of the candidate inter-layer reference pictures may be used as reference for inter-layer prediction. The picture-level information may for example reside in a slice header and may be referred to as an inter-layer reference picture set. For example, the candidate inter-layer reference pictures may be indexed in a certain order and one or more indexes may be included in the inter-layer reference picture set. In another example, a flag for each candidate inter-layer reference picture indicates if it may be used as an inter-layer reference picture. As above, the inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists.

In the coding and/or decoding process, the inter-layer reference pictures may be treated as long term reference pictures.

In SMV-HEVC and a reference index based SHVC solution, inter-layer motion parameter prediction may be performed by setting the inter-layer reference picture as the collocated reference picture for TMVP derivation. A motion field mapping process between two layers may be performed for example to avoid block level decoding process modification in TMVP derivation. A motion field mapping could also be performed for multiview coding, but a present draft of MV-HEVC does not include such a process. The use of the motion field mapping feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

In a motion field mapping process for spatial scalability, the motion field of the upsampled inter-layer reference picture is attained based on the motion field of the respective reference layer picture. The motion parameters (which may e.g. include a horizontal and/or vertical motion vector value and a reference index) and/or a prediction mode for each block of the upsampled inter-layer reference picture may be derived from the corresponding motion parameters and/or prediction mode of the collocated block in the reference layer picture. The block size used for the derivation of the motion parameters and/or prediction mode in the upsampled inter-layer reference picture may be for example 16×16. The 16×16 block size is the same as in HEVC TMVP derivation process where compressed motion field of reference picture is used.

A texture view refers to a view that represents ordinary video content, for example has been captured using an ordinary camera, and is usually suitable for rendering on a display. A texture view typically comprises pictures having three components or sample arrays, one luma component and two chroma components. In the following, a texture picture typically comprises all its component pictures or color components unless otherwise indicated for example with terms luma texture picture and chroma texture picture.

Ranging information for a particular view represents distance information of a texture sample from the camera sensor, disparity or parallax information between a texture sample and a respective texture sample in another view, or similar information.

Ranging information of real-word 3D scene depends on the content and may vary for example from 0 to infinity. Different types of representation of such ranging information can be utilized.

A depth view refers to a view that represents distance information of a texture sample from the camera sensor, disparity or parallax information between a texture sample and a respective texture sample in another view, or similar information. A depth view may comprise depth pictures (which may be also referred to as depth maps and depth view components) having one component, similar to the luma component of texture views.

Depth map may be considered to represent the values related to the distance of the surfaces of the scene objects from the view point of observer. A depth map is an image with per-pixel depth information or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis.

Since depth maps are generated containing a depth value for each pixel in the image, they can be depicted as gray-level images or images containing only the luma component. Alternatively chroma components of the depth map images may be set to a pre-defined value, such as a value indicating no chromaticity, e.g. 128 in typical 8-bit chroma sample arrays, where a zero chromaticity level is arranged into the middle of the value range. Alternatively chroma components of depth map images may be used to contain other picture data, such as any type of monochrome auxiliary pictures, such as alpha planes.

The semantics of depth map values may for example include the following:
1. Each luma sample value in a coded depth view component represents an inverse of real-world distance (Z) value, i.e. 1/Z, normalized in the dynamic range of the luma samples, such as to the range of 0 to 255, inclusive, for 8-bit luma representation. The normalization may be done in a manner where the quantization 1/Z is uniform in terms of disparity.
2. Each luma sample value in a coded depth view component represents an inverse of real-world distance (Z) value, i.e. 1/Z, which is mapped to the dynamic range of the luma samples, such as to the range of 0 to 255, inclusive, for 8-bit luma representation, using a mapping function f(1/Z) or table, such as a piece-wise linear mapping. In other words, depth map values result in applying the function f(1/Z).
3. Each luma sample value in a coded depth view component represents a real-world distance (Z) value normalized in the dynamic range of the luma samples, such as to the range of 0 to 255, inclusive, for 8-bit luma representation.
4. Each luma sample value in a coded depth view component represents a disparity or parallax value from the present depth view to another indicated or derived depth view or view position.

The semantics of depth map values may be indicated in the bitstream for example within a video parameter set syntax structure, a sequence parameter set syntax structure, a video usability information syntax structure, a picture parameter set syntax structure, a camera/depth/adaptation parameter set syntax structure, a supplemental enhancement information message, or anything alike.

While phrases such as depth view, depth view component, depth picture and depth map are used to describe various embodiments, it is to be understood that any semantics of depth map values may be used in various embodiments including but not limited to the ones described above. For example, embodiments of the invention may be applied for depth pictures where sample values indicate disparity values. Phrases depth view component and depth picture may be used interchangeably and may have the same semantics in many embodiments.

An encoding system or any other entity creating or modifying a bitstream including coded depth maps may create and include information on the semantics of depth samples and on the quantization scheme of depth samples into the bitstream. Such information on the semantics of depth samples and on the quantization scheme of depth samples may be for example included in a video parameter set structure, in a sequence parameter set structure, or in a SEI message.

In many cases, depth maps can be considered approximately piecewise planar, with highly homogeneous regions separated by strong contours. As a result, one can conclude that by preserving more the contours, the possibility of exploiting depth map for virtual view synthesis issues will increase. This can be confirmed while observing the abundant ongoing research on the segmentation based compression methods applied to depth maps or different edge aware depth map resampling algorithms.

Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. In the LDV representation, the texture and depth of the central view are represented conventionally, while the texture and depth of the other views are partially represented and cover only the dis-occluded areas required for correct view synthesis of intermediate views.

The MVD representation refers to a set of texture views accompanied with per-pixel depth map components. The reason to include depth maps is to exploit them in different de(coding) and post processing steps e.g. increase the efficiency of texture view compression or use them in view synthesis. The higher the quality of depth map, the better the quality of virtual rendered views and the less the synthesis artefacts presented in the rendered views. However, in some cases, if the depth map quality is very low, the synthesis artefacts in rendered view might dominate the subjective quality and hence, the rendered view cannot be considered to be viewed to the end user.

A texture view component may be defined as a coded representation of the texture of a view in a single access unit. A texture view component in depth-enhanced video bitstream may be coded in a manner that is compatible with a single-view texture bitstream or a multi-view texture bitstream so that a single-view or multi-view decoder can decode the texture views even if it has no capability to decode depth views. For example, an H.264/AVC decoder may decode a single texture view from a depth-enhanced H.264/AVC bitstream. A texture view component may alternatively be coded in a manner that a decoder capable of single-view or multi-view texture decoding, such H.264/AVC or MVC decoder, is not able to decode the texture view component for example because it uses depth-based coding tools. A depth view component may be defined as a coded representation of the depth of a view in a single access unit. A view component pair may be defined as a texture view component and a depth view component of the same view within the same access unit.

Depth-enhanced video may be coded in a manner where texture and depth are coded independently of each other. For example, texture views may be coded as one MVC bitstream and depth views may be coded as another MVC bitstream. Depth-enhanced video may also be coded in a manner where texture and depth are jointly coded. In a form of a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

The term view synthesis refers to the rendering of images of an observed object or scene from new view-points.

Virtual view rendering may, for example, use pairs of neighboring original camera views to render arbitrary virtual views on a specified camera path between them. Depth-image-based rendering (DIBR) or view synthesis refers to generation of a novel view based on one or more existing/received views.

Depth-enhanced video formats enable generation of virtual views or pictures at camera positions that are not represented by any of the coded views. Generally, any depth-image-based rendering (DIBR) algorithm may be used for synthesizing views.

The relation between points in 3D scene space and the values in a depth map may be defined by the projection matrix, allowing for projecting and unprojecting depth data.

First the depth maps may be unprojected, resulting in a colored 3D particle cloud for each original camera. Next the projection matrix of a virtual camera may be calculated from the two original cameras projection matrices by spherical linear interpolation (SLERP) and/or linear interpolation (LERP). These methods originate from computer graphics in the context of quaternion interpolation. Using the projection matrix of virtual cameras the virtual view may be rendered with weighting according to the virtual camera's position relative to the original cameras.

Depth images may be used to assist in correct synthesis of the virtual views. Although differing in details, most of the view synthesis algorithms utilize 3D warping based on explicit geometry, i.e., depth images, where typically each texture pixel is associated with a depth pixel indicating the distance or the z-value from the camera to the physical object from which the texture pixel was sampled. Typically, either a non-Euclidean formulation or an Euclidian formulation of the 3D warping may be used. The non-Euclidean formulation of the 3D warping is efficient under the condition that the camera parameters are unknown or the camera calibration is poor. In the Euclidean formulation, it is assumed that the camera parameters for the acquisition and view interpolation are known.

Occlusions, pinholes, and reconstruction errors are the most common artifacts introduced in the 3D warping process. These artifacts occur more frequently in the object edges, where pixels with different depth levels may be mapped to the same pixel location of the virtual image. When those pixels are averaged to reconstruct the final pixel value for the pixel location in the virtual image, an artifact might be generated, because pixels with different depth levels usually belong to different objects.

The depth map video stream for a single view can be regarded as a regular monochromatic video stream and coded with any video codec. The essential characteristics of the depth map stream, such as the minimum and maximum depth in world coordinates, can be indicated in messages formatted according to the MPEG-C Part 3 standard.

The detailed operation of view synthesis algorithms depend on which representation format has been used for texture views and depth picture sequences.

Texture views and depth views may be coded into a single bitstream where some of the texture views may be compatible with one or more video standards such as H.264/AVC and/or MVC. In other words, a decoder may be able to decode some of the texture views of such a bitstream and can omit the remaining texture views and depth views.

An amendment has been specified for the H.264/AVC for depth map coding. The amendment is called MVC extension for inclusion of depth maps and may be referred to as MVC+D. The MVC+D amendment specifies the encapsulation of texture views and depth views into the same bitstream in a manner that the texture views remain compatible with H.264/AVC and MVC so that an MVC decoder is able to decode all texture views of an MVC+D bitstream and an H.264/AVC decoder is able to decode the base texture view of an MVC+D bitstream. Furthermore, the VCL NAL units of the depth view use identical syntax, semantics, and decoding process to those of texture views below the NAL unit header.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

In a scheme referred to as unpaired multiview video-plus-depth (MVD), there may be an unequal number of texture and depth views, and/or some of the texture views might not have a co-located depth view, and/or some of the depth views might not have a co-located texture view, some of the depth view components might not be temporally coinciding with texture view components or vice versa, co-located texture and depth views might cover a different spatial area, and/or there may be more than one type of depth view components. Encoding, decoding, and/or processing of unpaired MVD signal may be facilitated by a depth-enhanced video coding, decoding, and/or processing scheme.

Terms co-located, collocated, and overlapping may be used interchangeably to indicate that a certain sample or area in a texture view component represents the same physical objects or fragments of a 3D scene as a certain co-located/collocated/overlapping sample or area in a depth view component. Different cases of sampling grid alignment between a texture view component and a depth view component are presented in the following:

In some cases, the sampling grid of a texture view component may be the same as the sampling grid of a depth view component, i.e. one sample of a component image, such as a luma image, of a texture view component corresponds to one sample of a depth view component, i.e. the physical dimensions of a sample match between a component image, such as a luma image, of a texture view component and the corresponding depth view component.

In some cases, sample dimensions (twidth×theight) of a sampling grid of a component image, such as a luma image, of a texture view component may be an integer multiple of sample dimensions (dwidth×dheight) of a sampling grid of a depth view component, i.e. twidth=m×dwidth and theight=n×dheight, where m and n are positive integers. In some embodiments, dwidth=m×twidth and dheight=n×theight, where m and n are positive integers.

In some cases, twidth=m×dwidth and theight=n×dheight or alternatively dwidth=m×twidth and dheight=n×theight, where m and n are positive values and may be non-integer. In these cases, an interpolation scheme may be used in the encoder and in the decoder and in the view synthesis process and other processes to derive co-located sample values between texture and depth.

In some cases, the physical position of a sampling grid of a component image, such as a luma image, of a texture view component may match that of the corresponding depth view and the sample dimensions of a component image, such as a luma image, of the texture view component may be an integer multiple of sample dimensions (dwidth×dheight) of a sampling grid of the depth view component (or vice versa)—then, the texture view component and the depth view component may be considered to be co-located and represent the same viewpoint.

In some cases, the position of a sampling grid of a component image, such as a luma image, of a texture view component may have an integer-sample offset relative to the sampling grid position of a depth view component, or vice versa. In other words, a top-left sample of a sampling grid of a component image, such as a luma image, of a texture view component may correspond to the sample at position (x, y) in the sampling grid of a depth view component, or vice versa, where x and y are non-negative integers in a two-dimensional Cartesian coordinate system with non-negative values only and origo in the top-left corner. In some cases, the values of x and/or y may be non-integer and consequently an interpolation scheme may be used in the encoder and in the decoder and in the view synthesis process and other processes to derive co-located sample values between texture and depth.

In some cases, the sampling grid of a component image, such as a luma image, of a texture view component may have unequal extents compared to those of the sampling grid of a depth view component. In other words, the number of samples in horizontal and/or vertical direction in a sampling grid of a component image, such as a luma image, of a texture view component may differ from the number of samples in horizontal and/or vertical direction, respectively, in a sampling grid of a depth view component and/or the physical width and/or height of a sampling grid of a component image, such as a luma image, of a texture view component may differ from the physical width and/or height, respectively, of a sampling grid of a depth view component.

In some cases, non-uniform and/or non-matching sample grids can be utilized for texture and/or depth component. A sample grid of depth view component is non-matching with the sample grid of a texture view component when the sampling grid of a component image, such as a luma image, of the texture view component is not an integer multiple of sample dimensions (dwidth×dheight) of a sampling grid of the depth view component or the sampling grid position of a component image, such as a luma image, of the texture view component has a non-integer offset compared to the sampling grid position of the depth view component or the sampling grids of the depth view component and the texture view component are not aligned/rectified. This could happen for example on purpose to reduce redundancy of data in one of the components or due to inaccuracy of the calibration/rectification process between a depth sensor and a color image sensor.

Spatial resolution of an image or a picture may be defined as the number of pixels or samples representing the image/picture in horizontal and vertical direction. In this document, expressions such as "images at different resolution" may be interpreted as two images have different number of pixels either in horizontal direction, or in vertical direction, or in both directions.

In signal processing, resampling of images is usually understood as changing the sampling rate of the current image in horizontal or/and vertical directions. Resampling results in a new image which is represented with different number of pixels in horizontal or/and vertical direction. In some applications, the process of image resampling is equal to image resizing. In general, resampling is classified in two processes: downsampling and upsampling.

Downsampling or subsampling process may be defined as reducing the sampling rate of a signal, and it typically results in reducing of the image sizes in horizontal and/or vertical directions . . . . In image downsampling, the spatial resolution of the output image, i.e. the number of pixels in the output image, is reduced compared to the spatial resolution of the input image. Downsampling ratio may be defined as the horizontal or vertical resolution of the downsampled image divided by the respective resolution of the input image for downsampling. Downsampling ratio may alternatively be defined as the number of samples in the downsampled image divided by the number of samples in the input image for downsampling. As the two definitions differ, the term downsampling ratio may be further characterized by indicating whether it is indicated along one coordinate axis or both coordinate axes (and hence as a ratio of number of pixels in the images). Image downsampling may be performed for example by selecting a specific number of pixels, based on the downsampling ratio, out of the total number of pixels in the original image.

Upsampling process may be defined as increasing the sampling rate of the signal, and it typically results in increasing of the image sizes in horizontal and/or vertical directions. In image upsampling, the spatial resolution of the output image, i.e. the number of pixels in the output image, is increased compared to the spatial resolution of the input image. Upsampling ratio may be defined as the horizontal or vertical resolution of the upsampled image divided by the respective resolution of the input image. Upsampling ratio may alternatively be defined as the number of samples in the upsampled image divided by the number of samples in the input image. As the two definitions differ, the term upsampling ratio may be further characterized by indicating whether it is indicated along one coordinate axis or both coordinate axes (and hence as a ratio of number of pixels in the images). Image upsampling may be performed for example by selecting a specific number of pixels, based on the upsampling ratio, out of the total number of pixels in the original image.

Downsampling can be utilized in image/video coding to improve coding efficiency of existing coding scheme or to reduce computation complexity of these solutions. For example, quarter-resolution (half-resolution along both coordinate axes) depth maps compared to the texture pictures may be used as input to transform-based coding such as H.264/AVC, MVC, MVC+D, HEVC, MV-HEVC, combinations and/or derivations thereof, or any similar coding scheme.

Alternatively, upsampling process is commonly used in state-of-the-art video coding technologies in order to improve coding efficiency of those. For example, 4× resolution upsampling of coded video data may be utilized in coding loop of H.264/AVC, MVC, MVC+D, HEVC, MV-HEVC combinations and/or derivations thereof, or any similar coding scheme due to ¼-pixel motion vector accuracy and interpolation of the sub-pixel values for the ¼-pixel grid that can be referenced by motion vectors.

A scalable video encoder and/or decoder for quality and/or spatial scalability may be implemented as follows. For a base layer, a conventional non-scalable video encoder and/or decoder may be used. The reconstructed/decoded pictures of the base layer may be included in the reference picture buffer and/or inter-layer reference picture set and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it may be referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer and/or inter-layer reference picture set and/or reference picture lists of an enhancement layer, and each of these inter-layer reference pictures may be considered to reside in a base layer or a reference layer for the enhancement layer being encoded and/or decoded.

In scalable multiview coding, the same bitstream may contain coded view components of multiple views and at least some coded view components may be coded using quality and/or spatial scalability.

Figure 12A:
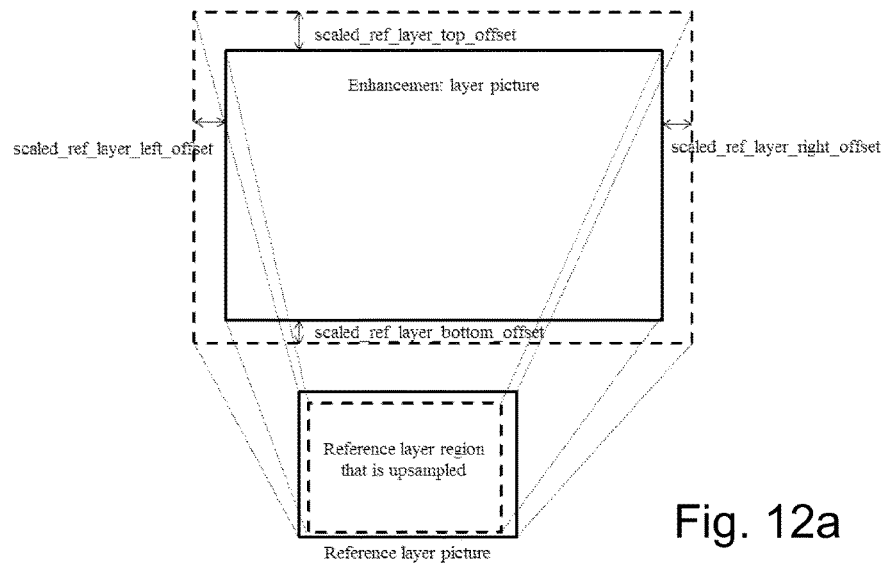
FIG. 12a shows an example of scaled reference layer offsets for an enhancement layer enhancing a region of the reference layer.
Figure 12B:
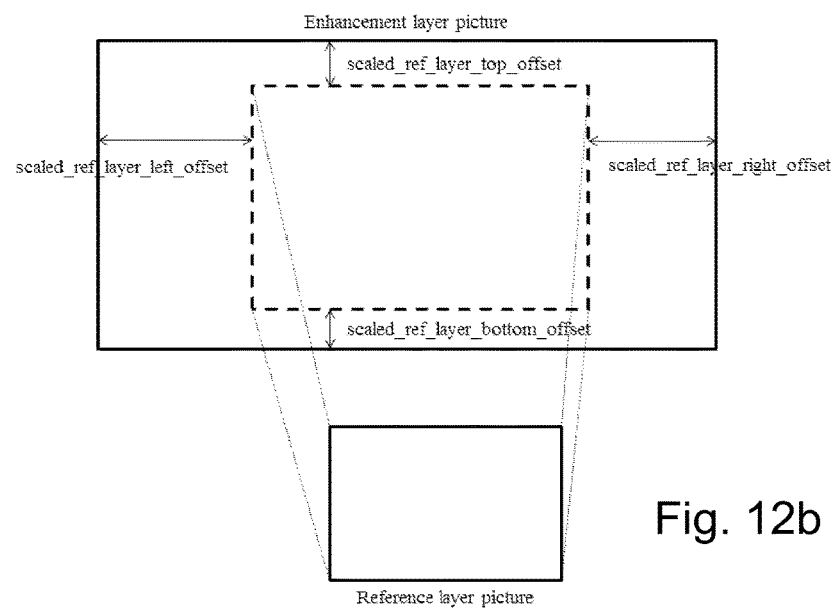
FIG. 12b shows an example of scaled reference layer offsets for a region of an enhancement layer corresponding to the reference layer picture.

Scalable video encoding and/or decoding methods may support enhancement layers that enhance a region of the reference-layer picture, illustrated in FIG. 12a, and/or that enhance a superset of the reference-layer picture area, illustrated in FIG. 12b. In the latter case, the base-layer picture may be considered to correspond to a region of the enhancement layer picture. Such spatial scalability may be referred to as extended spatial scalability.

The spatial correspondence between the enhancement layer picture and the reference layer region, or similarly the enhancement layer region and the base layer picture may be indicated by the encoder and/or decoded by the decoder using for example so-called scaled reference layer offsets. Scaled reference layer offsets may be considered to specify the positions of the corner samples of the upsampled reference layer picture relative to the respective corner samples of the enhancement layer picture. Scaled reference layer offsets may be indicated by four syntax elements (e.g. per a pair of an enhancement layer and its reference layer), which may be referred to as scaled_ref layer_top_offset, scaled_ref layer_bottom_offset, scaled_ref layer_right_offset and scaled_ref layer_left_offset. The offset values may be signed, which enables the use of the offset values to be used in both types of extended spatial scalability, illustrated in FIGS. 12a and 12b. In case of region-of-interest scalability (FIG. 12a), the enhancement layer picture corresponds to a region of the reference layer picture and the scaled reference layer offsets indicate the corners of the upsampled reference layer picture that extend the area of the enhance layer picture. The reference layer region that is upsampled may be concluded by the encoder and/or the decoder by downscaling the scaled reference layer offsets according to the ratio between the enhancement layer picture height or width and the upsampled reference layer picture height or width, respectively. The downscaled scaled reference layer offset may be then be used to obtain the reference layer region that is upsampled and/or to determine which samples of the reference layer picture collocate to certain samples of the enhancement layer picture. In case the reference layer picture corresponds to a region of the enhancement layer picture (FIG. 12b), the scaled reference layer offsets indicate the corners of the upsampled reference layer picture that are within the area of the enhance layer picture. The scaled reference layer offset may be used to determine which samples of the upsampled reference layer picture collocate to certain samples of the enhancement layer picture. It is also possible to mix the types of extended spatial scalability, i.e apply one type horizontally and another type vertically. Scaled reference layer offsets may be indicated by the encoder in and/or decoded by the decoder from for example a sequence-level syntax structure, such as SPS and/or VPS. The accuracy of scaled reference offsets may be pre-defined through variable $rlPicSample_L$. The resampled luma sample value is derived for a luma sample location (xP, yP) relative to the top-left luma sample of the enhancement-layer picture. As result, the process generates a resampled luma sample, accessed through variable intLumaSample. In this example the following 8-tap filter with coefficients $f_L[p, x]$ with p=0 . . . 15 and x=0 . . . 7 is used for the luma resampling process.

| | interpolation filter coefficients | | | | | | | |
|---|---|---|---|---|---|---|---|---|
| phase p | $f_L[p, 0]$ | $f_L[p, 1]$ | $f_L[p, 2]$ | $f_L[p, 3]$ | $f_L[p, 4]$ | $f_L[p, 5]$ | $f_L[p, 6]$ | $f_L[p, 7]$ |
| 0  | 0  | 0 | 0   | 64 | 0  | 0   | 0 | 0  |
| 1  | 0  | 1 | −3  | 63 | 4  | −2  | 1 | 0  |
| 2  | −1 | 2 | −5  | 62 | 8  | −3  | 1 | 0  |
| 3  | −1 | 3 | −8  | 60 | 13 | −4  | 1 | 0  |
| 4  | −1 | 4 | −10 | 58 | 17 | −5  | 1 | 0  |
| 5  | −1 | 4 | −11 | 52 | 26 | −8  | 3 | −1 |
| 6  | −1 | 3 | −9  | 47 | 31 | −10 | 4 | −1 |
| 7  | −1 | 4 | −11 | 45 | 34 | −10 | 4 | −1 |
| 8  | −1 | 4 | −11 | 40 | 40 | −11 | 4 | −1 |
| 9  | −1 | 4 | −10 | 34 | 45 | −11 | 4 | −1 |
| 10 | −1 | 4 | −10 | 31 | 47 | −9  | 3 | −1 |
| 11 | −1 | 3 | −8  | 26 | 52 | −11 | 4 | −1 |
| 12 | 0  | 1 | −5  | 17 | 58 | −10 | 4 | −1 |
| 13 | 0  | 1 | −4  | 13 | 60 | −8  | 3 | −1 |
| 14 | 0  | 1 | −3  | 8  | 62 | −5  | 2 | −1 |
| 15 | 0  | 1 | −2  | 4  | 63 | −3  | 1 | 0  | for example in a coding standard and/or specified by the encoder and/or decoded by the decoder from the bitstream. For example, an accuracy of $1/16^{th}$ of the luma sample size in the enhancement layer may be used. Scaled reference layer offsets may be indicated, decoded, and/or used in the encoding, decoding and/or displaying process when no inter-layer prediction takes place between two layers.

The encoder and/or the decoder may derive a horizontal scale factor (e.g. stored in variable ScaleFactorX) and a vertical scale factor (e.g. stored in variable ScaleFactorY) for a pair of an enhancement layer and its reference layer for example based on the scaled reference layer offsets for the pair. If either or both scale factors are not equal to 1, the reference layer picture may be resampled to generate a reference picture for predicting the enhancement layer picture. The process and/or the filter used for resampling may be pre-defined for example in a coding standard and/or indicated by the encoder in the bitstream (e.g. as an index among pre-defined resampling processes or filters) and/or decoder by the decoder from the bitstream. A different resampling process may be indicated by the encoder and/or decoded by the decoder and/or inferred by the encoder and/or the decoder depending on the values of the scale factor. For example, when both scale factors are less than 1, a pre-defined downsampling process may be inferred; and when both scale factors are greater than 1, a pre-defined upsampling process may be inferred. Additionally or alternatively, a different resampling process may be indicated by the encoder and/or decoded by the decoder and/or inferred by the encoder and/or the decoder depending on which sample array is processed. For example, a first resampling process may be inferred to be used for luma sample arrays and a second resampling process may be inferred to be used for chroma sample arrays.

An example of an inter-layer resampling process for obtaining a resampled luma sample value is provided in the following. The input luma sample array, which may be also referred to as the luma reference sample array, is referred The value of the interpolated luma sample IntLumaSample may be derived by applying the following ordered steps:

1. The reference layer sample location corresponding to or collocating with (xP, yP) may be derived for example on the basis of scaled reference layer offsets. This reference layer sample location is referred to as (xRef16, yRef16) in units of $1/16$-th sample.
2. The variables xRef and xPhase are derived as follows:

$x$Ref=($x$Ref16>>4)

$x$Phase=($x$Ref16)%16 where
    ">>" is a bit-shift operation to the right, i.e. an arithmetic right shift of a two's complement integer representation of x by y binary digits. This function may be defined only for non-negative integer values of y. Bits shifted into the MSBs (most significant bits) as a result of the right shift have a value equal to the MSB of x prior to the shift operation.
    "%" is a modulus operation, i.e. the remainder of x divided by y, defined only for integers x and y with x>=0 and y>0.
3. The variables yRef and yPhase are derived as follows:

$y$Ref=($y$Ref16>>4)

$y$Phase=($y$Ref16)%16

4. The variables shift1, shift2 and offset are derived as follows:

shift1=RefLayerBitDepth$_Y$−8 shift2=20−BitDepth$_Y$ offset=1<<(shift2−1)

where
RefLayerBitDepth$_Y$ is the number of bits per luma sample in the reference layer.

BitDepth$_Y$ is the number of bits per luma sample in the enhancement layer.

"<<" is a bit-shift operation to the left, i.e. an arithmetic left shift of a two's complement integer representation of x by y binary digits. This function may be defined only for non-negative integer values of y. Bits shifted into the LSBs (least significant bits) as a result of the left shift have a value equal to 0.

5. The sample value tempArray[n] with n=0 . . . 7, is derived as follows:

$$yPosRL=\text{Clip3}(0,\text{RefLayerPicHeightInSamples}Y-1, yRef+n-1)$$

$$refW=\text{RefLayerPicWidthInSamples}Y$$

$$\begin{aligned}\text{tempArray}[n]=&(f_{Lf}x\text{Phase},0]*rl\text{PicSample}_L[\text{Clip3}(0,\\&refW-1,x\text{Ref}-3),y\text{PosRL}]+f_{Lf}x\text{Phase},1]*rl\text{Pic-}\\&\text{Sample}_L[\text{Clip3}(0,refW-1,x\text{Ref}-2),y\text{PosRL}]+f_L\\&[x\text{Phase},2]*rl\text{PicSample}_L[\text{Clip3}(0,refW-1,x\\&\text{Ref}-1),y\text{PosRL}]+f_{Lf}x\text{Phase},3]*rl\text{PicSample}_L\\&[\text{Clip3}(0,refW-1,x\text{Ref}),y\text{PosRL}]+f_{Lf}x\text{Phase},4]\\&*rl\text{PicSample}_L[\text{Clip3}(0,refW-1,x\text{Ref}+1),\\&y\text{PosRL}]+f_{Lf}x\text{Phase},5]*rl\text{PicSample}_L[\text{Clip3}(0,\\&refW-1,x\text{Ref}+2),y\text{PosRL}]+f_{Lf}x\text{Phase},6]\\&*rl\text{PicSample}_L[\text{Clip3}(0,refW-1,x\text{Ref}+3),\\&y\text{PosRL}]+f_{Lf}x\text{Phase},7]*rl\text{PicSample}_L[\text{Clip3}(0,\\&refW-1,x\text{Ref}+4),y\text{PosRL}])>>\text{shift1}\end{aligned}$$

where
RefLayerPicHeightInSamplesY is the height of the reference layer picture in luma samples.

RefLayerPicWidthInSamplesY is the width of the reference layer picture in luma samples.

6. The interpolated luma sample value intLumaSample is derived as follows:

$$\begin{aligned}\text{intLumaSample}=&(f_L[y\text{Phase},0]*\text{tempArray}[0]+f_L\\&[y\text{Phase},1]*\text{tempArray}[1]+f_L[y\text{Phase},2]*\text{tempAr-}\\&\text{ray}[2]+f_L[y\text{Phase},3]*\text{tempArray}[3]+f_L[y\text{Phase},4]\\&*\text{tempArray}[4]+f_L[y\text{Phase},5]*\text{tempArray}[5]+f_L\\&[y\text{Phase},6]*\text{tempArray}[6]+f_L[y\text{Phase},7]\\&*\text{tempArray}[7]+\text{offset})>>\text{shift2}\end{aligned}$$

$$\text{intLumaSample}=\text{Clip3}(0,(1<<\text{BitDepth}_Y)-1,\text{intLu-maSample})$$

An example of an inter-layer resampling process for obtaining a resampled chroma sample value is provided in the following. The input chroma sample array, which may be also referred to as the chroma reference sample array, is referred through variable rlPicSample$_C$. The resampled chroma sample value is derived for a chroma sample location (xP$_C$, yP$_C$) relative to the top-left chroma sample of the enhancement-layer picture. As result, the process generates a resampled chroma sample, accessed through variable intChromaSample. In this example the following 4-tap filter with coefficients f$_C$[p, x] with p=0 . . . 15 and x=0 . . . 3 is used for the chroma resampling process.

| phase p | interpolation filter coefficients | | | |
|---|---|---|---|---|
| | f$_C$[p, 0] | f$_C$[p, 1] | f$_C$[p, 2] | f$_C$[p, 3] |
| 0 | 0 | 64 | 0 | 0 |
| 1 | -2 | 62 | 4 | 0 |
| 2 | -2 | 58 | 10 | -2 |
| 3 | -4 | 56 | 14 | -2 |
| 4 | -4 | 54 | 16 | -2 |
| 5 | -6 | 52 | 20 | -2 |
| 6 | -6 | 46 | 28 | -4 |
| 7 | -4 | 42 | 30 | -4 |
| 8 | -4 | 36 | 36 | -4 |
| 9 | -4 | 30 | 42 | -4 |
| 10 | -4 | 28 | 46 | -6 |
| 11 | -2 | 20 | 52 | -6 |
| 12 | -2 | 16 | 54 | -4 |
| 13 | -2 | 14 | 56 | -4 |
| 14 | -2 | 10 | 58 | -2 |
| 15 | 0 | 4 | 62 | -2 |

The value of the interpolated chroma sample value intChromaSample may be derived by applying the following ordered steps:

1. The reference layer sample location corresponding to or collocating with (xP$_C$, yP$_C$) may be derived for example on the basis of scaled reference layer offsets. This reference layer sample location is referred to as (xRef16, yRef16) in units of 1/16-th sample.

2. The variables xRef and xPhase are derived as follows:

$$x\text{Ref}=(x\text{Ref}16>>4)$$

$$x\text{Phase}=(x\text{Ref}16)\%16$$

3. The variables yRef and yPhase are derived as follows:

$$y\text{Ref}=(y\text{Ref}16>>4)$$

$$y\text{Phase}=(y\text{Ref}16)\%16$$

4. The variables shift1, shift2 and offset are derived as follows:

$$\text{shift1}=\text{RefLayerBitDepth}_C-8$$

$$\text{shift2}=20-\text{BitDepth}_C$$

$$\text{offset}=1<<(\text{shift2}-1)$$

where
RefLayerBitDepth$_C$ is the number of bits per chroma sample in the reference layer.

BitDepth$_C$ is the number of bits per chroma sample in the enhancement layer.

5. The sample value tempArray[n] with n=0 . . . 3, is derived as follows:

$$yPosRL=\text{Clip3}(0,\text{RefLayerPicHeightInSamples}C-1, yRef+n-1)$$

$$refWC=\text{RefLayerPicWidthInSamples}C$$

$$\begin{aligned}\text{tempArray}[n]=&(f_C[x\text{Phase},0]*rl\text{PicSample}_C[\text{Clip3}(0,\\&refWC-1,x\text{Ref}-1),y\text{PosRL}]+f_C[x\text{Phase},1]*rl\text{Pic-}\\&\text{Sample}_C[\text{Clip3}(0,refWC-1,x\text{Ref}),y\text{PosRL}]+f_C\\&[x\text{Phase},2]*rl\text{PicSample}_C[\text{Clip3}(0,refWC-1,\\&x\text{Ref}+1),y\text{PosRL}]+f_C[x\text{Phase},3]*rl\text{PicSample}_C\\&[\text{Clip3}(0,refWC-1,x\text{Ref}+2),y\text{PosRL}])>>\text{shift1}\end{aligned}$$

where
RefLayerPicHeightInSamplesC is the height of the reference layer picture in chroma samples.

RefLayerPicWidthInSamplesC is the width of the reference layer picture in chroma samples.

6. The interpolated chroma sample value intChromaSample is derived as follows:

intChromaSample=($f_C$[yPhase,0]*tempArray[0]+$f_C$[yPhase,1]*tempArray[1]+$f_C$[yPhase,1]*tempArray[2]+$f_C$[yPhase,3]*tempArray[3]++offset)>>shift2 intChromaSample=Clip3(0,(1<<BitDepth$_C$)−1,intChromaSample)

Resampling may be performed for example picture-wise (for the entire reference layer picture or region to be resampled), slice-wise (e.g. for a reference layer region corresponding to an enhancement layer slice) or block-wise (e.g. for a reference layer region corresponding to an enhancement layer coding tree unit). The resampling a reference layer picture for the determined region (e.g. picture, slice, or coding tree unit in an enhancement layer picture) may for example be performed by looping over all sample positions of the determined region and performing a sample-wise resampling process, such as those provided in the above examples, for each sample position. However, it is to be understood that other possibilities for resampling a determined region exist—for example, the filtering of a certain sample location may use variable values of the previous sample location.

The coding and/or decoding order of texture view components and depth view components may determine presence of syntax elements related to inter-component prediction and allowed values of syntax elements related to inter-component prediction.

In the case of joint coding of texture and depth for depth-enhanced video, view synthesis can be utilized in the loop of the codec, thus providing view synthesis prediction (VSP). In VSP, a prediction signal, such as a VSP reference picture, is formed using a DIBR or view synthesis algorithm, utilizing texture and depth information. For example, a synthesized picture (i.e., VSP reference picture) may be introduced in the reference picture list in a similar way as it is done with interview reference pictures and inter-view only reference pictures. Alternatively or in addition, a specific VSP prediction mode for certain prediction blocks may be determined by the encoder, indicated in the bitstream by the encoder, and used as concluded from the bitstream by the decoder.

In MVC, both inter prediction and inter-view prediction use similar motion-compensated prediction process. Inter-view reference pictures and inter-view only reference pictures are essentially treated as long-term reference pictures in the different prediction processes. Similarly, view synthesis prediction may be realized in such a manner that it uses essentially the same motion-compensated prediction process as inter prediction and inter-view prediction. To differentiate from motion-compensated prediction taking place only within a single view without any VSP, motion-compensated prediction that includes and is capable of flexibly selecting mixing inter prediction, inter-prediction, and/or view synthesis prediction is herein referred to as mixed-direction motion-compensated prediction.

As reference picture lists in MVC and an envisioned coding scheme for MVD and in similar coding schemes may contain more than one type of reference pictures, such as inter reference pictures (also known as intra-view reference pictures), inter-view reference pictures, inter-view only reference pictures, and/or VSP reference pictures, a term prediction direction may be defined to indicate the use of intra-view reference pictures (temporal prediction), inter-view prediction, or VSP. For example, an encoder may choose for a specific block a reference index that points to an inter-view reference picture, thus the prediction direction of the block is inter-view.

Term temporal instant or time instant or time instance or time entity may be defined to represent a same capturing time or output time or output order. For example, if a first view component of a first view is captured at the same time as a second view component in a second view, these two view components may be considered to be of the same time instant. An access unit may be defined to contain pictures (or view components) of the same time instant, and hence in this case pictures residing in an access unit may be considered to be of the same time instant. Pictures of the same time instant may be indicated (e.g. by the encoder) using multiple means and may be identified (e.g. by the decoding) using multiple means, such as a picture order count (POC) value or a timestamp (e.g. an output timestamp).

In most encoders the input video has YUV format. YUV is basically a raw uncompressed data video format which is a collection of raw pixel values in YUV color space. YUV video is composed of three components, namely one Luma i.e. Y and two Chroma i.e. U, V. Historical background of proposing such format is utilization in black and white televisions where there was a need to have a video signal transmission compatible with both color- and black and white-televisions infrastructures. In such scheme, the luma component was already available in the broadcasting technology and addition of UV Chroma components kept the technology compatible with both receivers.

Considering the nature of Luma and Chroma components, and based on the fact that all components are presenting the same scene, there is often a high correlation between the content of different components e.g. several edges and contours are similar. However, if there is not a distinct color difference on the same object in the scene, then there is no contour present in the Chroma components while there can be details and contours present on the same object in the Luma component.

As already discussed earlier, many hybrid video codecs, including H.264/AVC and HEVC, encode video information in two phases. In the first phase, predictive coding is applied for example as so-called sample prediction and/or as so-called syntax prediction. In the sample prediction (which may also be referred to as sample value prediction), pixel or sample values in a certain picture area or "block" are predicted. These pixel or sample values can be predicted, for example, using one or more of the following ways:

Motion compensation mechanisms (which may also be referred to as temporal prediction or motion-compensated temporal prediction or motion-compensated prediction or MCP), which involve finding and indicating an area in one of the previously encoded video frames that corresponds closely to the block being coded.

Inter-view prediction, which involves finding and indicating an area in one of the previously encoded view components that corresponds closely to the block being coded.

View synthesis prediction, which involves synthesizing a prediction block or image area where a prediction block is derived on the basis of reconstructed/decoded ranging information.

Inter-layer prediction using reconstructed/decoded samples, such as the so-called IntraBL (base layer) mode of SVC.

Inter-layer residual prediction, in which for example the coded residual of a reference layer or a derived residual from a difference of a reconstructed/decoded reference layer picture and a corresponding reconstructed/decoded enhancement layer picture may be used for predicting a residual block of the current enhancement layer block. A residual block may be added for example to a motion-compensated prediction block to obtain a final prediction block for the current enhancement layer block.

Intra prediction, where pixel or sample values can be predicted by spatial mechanisms which involve finding and indicating a spatial region relationship.

In the syntax prediction, which may also be referred to as parameter prediction, syntax elements and/or syntax element values and/or variables derived from syntax elements are predicted from syntax elements (de)coded earlier and/or variables derived earlier. Non-limiting examples of syntax prediction are provided below:

In motion vector prediction, motion vectors e.g. for inter and/or inter-view prediction may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of a previously coded/decoded picture can be predicted. The reference index may be predicted from adjacent blocks and/or co-located blocks in temporal reference picture. Differential coding of motion vectors may be disabled across slice boundaries.

The block partitioning, e.g. from CTU to CUs and down to PUs, may be predicted.

In filter parameter prediction, the filtering parameters e.g. for sample adaptive offset may be predicted.

Prediction approaches using image information from a previously coded image can also be called as inter prediction methods which may also be referred to as temporal prediction and motion compensation. Prediction approaches using image information within the same image can also be called as intra prediction methods.

As discussed earlier, the second phase is one of coding the error between the predicted block of pixels or samples and the original block of pixels or samples.

Another way of categorizing different types of prediction is to consider across which domains or scalability types the prediction crosses. This categorization may lead into one or more of the following types of prediction, which may also sometimes be referred to as prediction directions:

Temporal prediction e.g. of sample values or motion vectors from an earlier picture usually of the same scalability layer, view and component type (texture or depth).

Inter-view prediction (which may be also referred to as cross-view prediction) referring to prediction taking place between view components usually of the same time instant or access unit and the same component type.

Inter-layer prediction referring to prediction taking place between layers usually of the same time instant, of the same component type, and of the same view.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

Prediction approaches using image information from a previously coded image can also be called as inter prediction methods. Inter prediction may sometimes be considered to only include motion-compensated temporal prediction, while it may sometimes be considered to include all types of prediction where a reconstructed/decoded block of samples is used as prediction source, therefore including conventional inter-view prediction for example. Inter prediction may be considered to comprise only sample prediction but it may alternatively be considered to comprise both sample and syntax prediction. As a result of syntax and sample prediction, a predicted block of pixels of samples may be obtained.

If the prediction, such as predicted variable values and/or prediction blocks, is not refined by the encoder using any form of prediction error or residual coding, prediction may be referred to as inheritance. For example, in the merge mode of HEVC, the prediction motion information is not refined e.g. by (de)coding motion vector differences, and hence the merge mode may be considered as an example of motion information inheritance.

In conventional presentation of MVD, each texture view is accompanied with an associated depth map. However, it might not be necessary to always use all available depth maps in the post processing steps e.g. view synthesis. This is attributed to the fact that the depth map information might be redundant and highly correlated and hence, it might be possible to create part of them from the already decoded depth maps. For example, in a three-view scenario, where three texture and three depth maps are available, it might be useful to feed in the encoder with all 6 views but as the output, it might be enough to only encode two side view depth maps while omit the encoding or transmission of the middle depth view or encode the middle depth view with a lower spatial resolution. The middle depth view may be and view-synthesized as a post processing step in the decoding side. This will make it possible to encode the middle view depth map with a relatively lower spatial resolution targeting less bitrate and complexity while exploiting it for more efficient texture view compression.

It is known that motion vectors can be predicted or inherited from a texture picture to a depth picture or vice versa, particularly when the pictures represent the same viewpoint or camera position. However, since the sample values of the texture picture and the respective depth picture are obviously different, sample value prediction from a texture picture to a depth picture has not been proposed. Consequently, the compression benefit achievable from inter-component prediction (from texture to depth or vice versa) has been limited. This is particularly true in the so-called texture-first coding order, where texture views are (de)coded independently of depth views and hence texture views may conform to a multiview coding scheme, such as the MVC extension of H.264/AVC or the MV-HEVC extension of H.265/HEVC.

Now in order to at least alleviate the above problems, a method for deriving sample value prediction from a texture picture to a depth picture is presented hereinafter.

Figure 7:
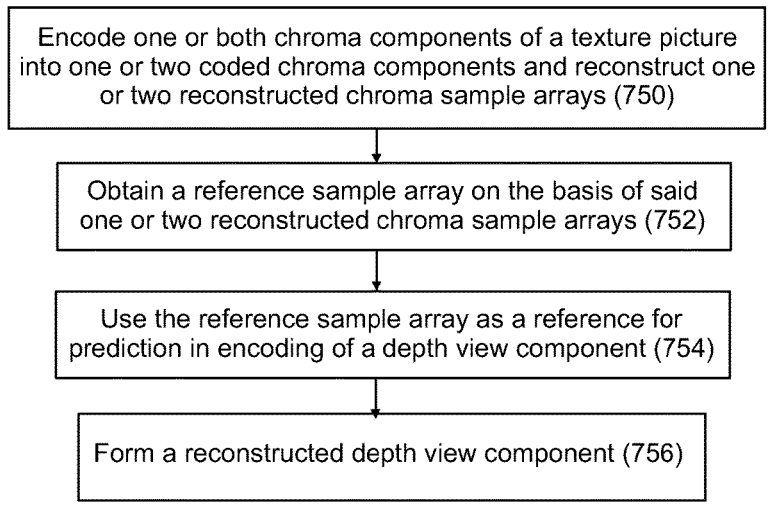
FIG. 7 shows a flow chart of an encoding method according to an embodiment of the invention.

In the method, which is disclosed in FIG. 7, one or both chroma components of a texture picture are encoded (750). Among the coded chroma components, the encoding results into one or two reconstructed chroma sample arrays. A reference sample array is then obtained (752) on the basis of said one or two reconstructed chroma sample arrays. The reference sample array is used (754) as a reference for predicting a depth view component and the depth view component is encoded using said prediction. Among the coded depth view component, the encoding may result into a reconstructed depth view component (756). Forming the reconstructed depth view component may be omitted in some embodiments, particularly if the reconstructed depth view component is not used as a reference for predicting other depth view components.

Figure 8:
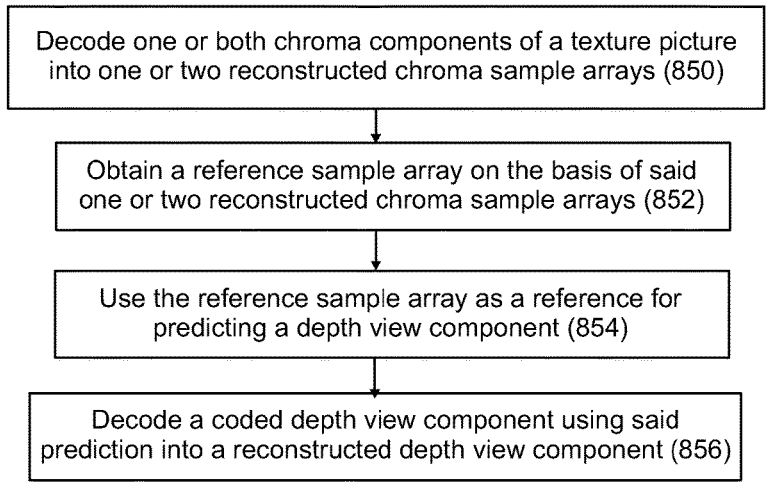
FIG. 8 shows a flow chart of a decoding method according to an embodiment of the invention.

A decoding method, which is disclosed in FIG. 8, may be considered analogous to the encoding method illustrated in FIG. 7 and described above. In FIG. 8, one or two coded chroma components of a coded texture picture are decoded (850) into one or two reconstructed chroma sample arrays. A reference sample array is then obtained (852) on the basis of said one or two reconstructed chroma sample arrays. The reference sample array is used (854) as a reference for predicting a depth view component and a coded depth view component is decoded (856) using said prediction into a reconstructed depth view component.

According to an embodiment, the encoding method and/or the decoding method further comprises using one of said reconstructed chroma sample arrays as the reference sample array. Thus, one of the chroma sample arrays may be used as such as a reference sample array.

Figure 9:
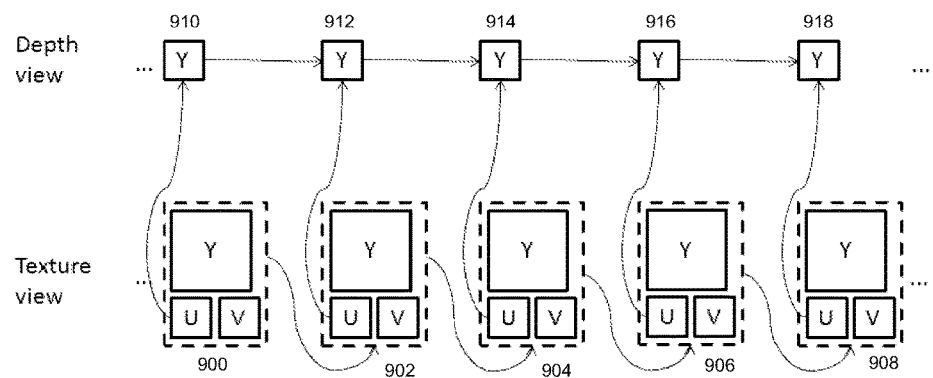
FIG. 9 illustrates an example where the reconstructed U sample arrays of pictures of a texture view are used as reference sample arrays for predicting the sample arrays of the respective depth pictures of a depth view.

FIG. 9 illustrates an example where the reconstructed U sample arrays of pictures (900, 902, 904, 906, 908) of a texture view are used as reference sample arrays for predicting the sample arrays of the respective depth pictures (910, 912, 914, 916, 918) of a depth view. For example, the depth sample array 912 is predicted from the U sample array of the texture picture 902. The depth picture or depth sample array 912 may additionally be predicted from earlier depth pictures or depth sample arrays, such as 910.

According to an embodiment, the encoding method and/or the decoding method further comprises using both of said reconstructed chroma sample arrays as the reference sample arrays. Thus, both of the chroma sample arrays may be used as such as reference sample arrays.

An encoder may indicate in a bitstream and a decoder may decode from a bitstream whether one or two chroma sample arrays are used in forming prediction for a depth view component. If one chroma sample array is indicated, decoded, or inferred to be used, an encoder may indicate in a bitstream and a decoder may decode from a bitstream which chroma sample array (U or V) is used in forming prediction for a depth view component. Said indications may reside for example in a sequence-level syntax structure, such as VPS and/or SPS, and/or they may reside in a picture-level syntax structure, such as PPS, slice header, and/or RPS.

According to an embodiment, the encoding method and/or the decoding method further comprises using a bi-directional prediction of said reconstructed chroma sample arrays as the reference sample array.

According to an embodiment, the encoding method and/or the decoding method further comprises modifying said one or two reconstructed chroma sample arrays in order to obtain the reference sample array. The modifying may be referred to as or may be a part of inter-layer processing. Other inter-layer processing may include reference picture resampling and/or motion field mapping. An inter-layer process may be defined as a decoding process which is applied to process reconstructed or decoded pictures of a first layer to be used as reference for prediction for another layer but which does not affect the reconstruction or decoding of any pictures of the first layer. Furthermore, inter-layer processes may exclude those processes that affect the reconstruction or decoding of pictures of a layer from the reference pictures.

Figure 10A:
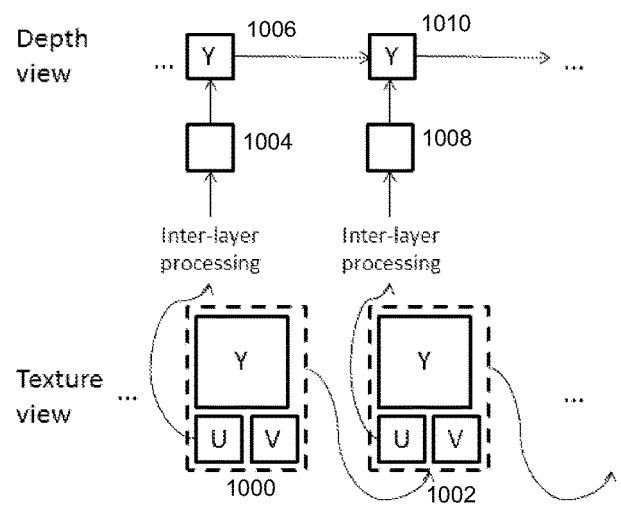
FIG. 10a illustrates an example where the reconstructed U sample arrays of pictures of a texture view are modified in inter-layer processing to be used for predicting the sample arrays of the respective depth pictures of a depth view.

FIG. 10a illustrates an example where the reconstructed U sample arrays of pictures (1000 and 1002) of a texture view are modified in inter-layer processing and the resulting reference sample arrays (1004 and 1008, respectively) are used for predicting the sample arrays of the respective depth pictures (1006 and 1010, respectively) of a depth view. For example, the depth sample array 1010 is predicted from the reference sample array 1008, which is created by modifying the U sample array of the texture picture 1002. The depth picture or depth sample array 1010 may additionally be predicted from earlier depth pictures or depth sample arrays, such as 1006.

It may be useful to have several modes to modify said one or two reconstructed chroma sample arrays. The encoder may indicate in the bitstream which mode or modes are used and the decoder may decode from the indication(s) in the bitstream which mode or modes are used. Likewise, parameters and/or parameter values controlling the mode(s) may be encoded into the bitstream and decoded from the bitstream. One of the modes may be to omit the processing of the chroma sample arrays and use a chroma sample array as such as a reference for prediction of a depth view component. The indications may be included for example in a sequence-level syntax structure, such as VPS and/or SPS, and/or in a picture-level syntax structure, such as PPS.

In some embodiments, a mode of modifying said one or two reconstructed chroma sample arrays may be pre-defined for example in a coding standard or inferred by the encoder and/or the decoder for example based on other parameter values.

Various modes for modifying said one or two reconstructed chroma sample arrays are presented hereinafter.

According to an embodiment, said modifying comprises quantizing sample values of said one or two reconstructed chroma sample arrays.

In this approach, all or some pixel or sample values in chroma components are quantized. The quantization of sample values may be carried out in various ways. For example, tone mapping techniques can be exploited, such as the tone mapping represented by A. Segall, L. Kerofsky, S. Lei, "New Results with the Tone Mapping SEI Message," Joint Video Team, Doc. JVT-U041, Hangzhou, China, October 2006. An example of linear chroma value quantization with rounding may be expressed as below:

$$q = \text{round}\left(\frac{i \times w}{2^d}\right) = (i \times w + 2^{d-1}) >> d. \tag{1}$$

where:
q is the quantized sample value,
round is a function retiring the closest integer,
i is the input value of the chroma sample,
w is the explicit integer weight ranging, for example, from 1 to 127, and
d is the base 2 logarithm of the denominator for weighting.

The quantized sample values may be scaled back to the original value range of the sample values.

Such modification of chroma components can be used to decrease the amount of contours within objects having the same or similar depth level.

According to an embodiment, a predefined weighted prediction method may be used for said sample value quantization.

The encoder may encode weighting parameters, such as the multiplicative weight (e.g. w in Eq. 1) and an additive offset value, into a bitstream. The encoder may indicate (within the bitstream) the weighting parameters to be used for a particular picture or one or more particular chroma sample arrays, when the chroma sample arrays (of the picture) are used for predicting a depth picture. If a particular picture is indicated, the encoder may indicate for which one of the chroma sample arrays of the picture weighted prediction with the weighting parameters is to be applied or that both chroma sample arrays of the picture are subject to weighted prediction with the weighting parameters. Alternatively, it may be pre-defined for example in a coding standard which chroma sample array is to be processed with weighted prediction.

In some embodiments, one set of weighting parameters may be assigned for a picture for example using the syntax of H.264/AVC, H.265/HEVC, or a similar syntax. In some embodiments, two or more sets of weighting parameters may be assigned for a picture, where one set may be used when the picture is used conventionally as a reference for prediction for other texture pictures and another set may be used when the picture is used as a reference for prediction of a depth picture.

In some embodiments, the decoder may conclude from the type of the pictures (the current picture being decoded being a depth picture and the reference picture for prediction being a texture picture) that the weighting parameters are to be applied for one or more chroma sample arrays. In some embodiments, the encoder may encode in the bitstream and the decoder may decode from the bitstream specific indications that the weighting parameters are to be applied for one or more chroma sample arrays.

According to an embodiment, said modifying comprises segmenting said one or two reconstructed chroma sample arrays. Segmenting may be performed by but is not limited to one or more of the ways presented in the following paragraphs.

According to an embodiment, said segmenting comprises creating a histogram of the sample values of said one or two reconstructed chroma sample arrays and dividing the sample values or bins of the histogram into ranges having approximately equal number of sample values or according to a certain other distribution, which may be pre-defied for example in a coding standard or alternatively encoded into a bitstream by an encoder and/or decoded from a bitstream by a decoder. Alternatively, a method to divide the histogram into ranges may be pre-defined for example in a coding standard or indicated, for example among a set of pre-defined methods, in the bitstream by an encoder and/or decoded from the bitstream by a decoder. The number of histogram bins and/or ranges may be pre-defined for example in a coding standard or alternatively it may be encoded into a bitstream and/or decoded from the bitstream. Said one or two reconstructed chroma pictures are segmented into segments such a way that each sample is allocated into one segment based on the histogram range enclosing the sample value.

According to an embodiment, the sample values of said one or two reconstructed chroma sample arrays are segmented on the basis of location and/or type of contours represented by said chroma sample arrays. Herein, instead of segmenting the chroma components based on the histogram technique, other approaches based on the location and type of the contours in the chroma may be used to perform the segmentation. For example, in the segmentation process introduced by F. Jager, "Contour-based segmentation and coding for depth map compression," in the Proceedings of Visual Communications and Image Processing (VCIP), 2011, the following steps are taken into account:

Contours in the chroma are computed: a value $\lambda$ is defined and the set $D\lambda=\{x,y|d(x,y)>\lambda\}$ where $d(x,y)$ is the chroma value at position $(x,y)$ is defined. Increasing the number of used $\lambda$ values results in a finer-grained representation of the chroma component.

A suitable modelling function for each closed contour area is selected. Two modelling functions are allowed in this scheme:

Considering the semi piecewise-linear segments bounded by sharp edges i.e. similar characteristics as depth map and can be achieved by applying a bi-lateral filter, linear approximation described by the following equation is one function utilized:

$$d1(x,y)=\beta 0+\beta 1 x+\beta 2 y \qquad (2.)$$

where the parameters are computed by a least square minimization for the segment's pixels.

Since many objects in a segment may have constant values or very small standard deviations, constant modelling function is considered:

$$d0(x,y)=\alpha 0 \qquad (3.)$$

where $\alpha 0$ is the mean value of the segment's pixels

Following this, a cost function based on the required bitrate $R(di)$ and the distortion $MSE(di)$ is used to find the optimal modelling function. This is shown in the following equation:

$$d_s = \arg\min_{d_i \in \{d_0, d_1\}} (MSE(d_i) + \mu R(d_i)). \qquad (4)$$

Moreover, the pixels lying on contours are also approximated by adjacent segment values.

Finally, to adjust the values, a residual signal is applied.

The contour lines can be encoded with a lossless algorithm used for bi-level image coding, such as the algorithm introduced by P. Howard, F. Kossentini, B. Martins, S. Forchhammer, and W. Rucklidge, "The emerging JBIG2 standard," IEEE Transactions on Circuits and Systems for Video Technology, vol. 8, no. 7, pp. 838-848, 2002. Moreover, for each segment one bit may be used to signal the selected modelling function for that region.

According to an embodiment, said segmenting is followed by and said modifying further comprises modifying the sample values in each segment so that the sample values are replaced by a representative value. The representative value for a segment may be obtained for example by one or more of the ways presented in the following paragraphs.

In some embodiments, the encoder and/or the decoder derives a mean value or a median value of all samples in said segment. Alternatively, some other mathematical and/or logical function of the collocated depth samples may be used. The mathematical and/or logical function may be pre-defined for example in a coding standard or alternatively it may be encoded, for example as an index among a set of pre-defined function, into a bitstream by an encoder and/or decoded from a bitstream by a decoder.

Some more exemplary details of the embodiment of the previous paragraph is described herein. A histogram H(x) of a chroma component is created. The x-axis may represent the sample values and the y-axis may represent the number of pixels having the value in the x-axis. The x-axis values will be divided to N contiguous ranges, where the number of pixels in each range is approximately equal. Then the pixel values falling into each range are modified using the mean value or the median value of all pixels in the segment corresponding to the range. In this approach, by changing the value of N, the number of segments in the chroma component can be modified, which may change the amount of contours present.

In some embodiments, the encoder derives a mean value or a median value of all collocated depth samples in a corresponding (uncompressed) depth view component in said segment. Alternatively, some other mathematical and/or logical function of the collocated depth samples may be used. The mathematical and/or logical function may be pre-defined for example in a coding standard or alternatively it may be encoded, for example as an index among a set of pre-defined function, into a bitstream by an encoder and/or decoded from a bitstream by a decoder. Here, collocated depth samples are those that spatially collocate or correspond to the samples in of a segment within said one or two reconstructed sample arrays. The encoder encodes the representative value (i.e. the derived mean value or median value or the value of the selected other function) for each range (or equivalently for each segment) into the bitstream. The decoder decodes the representative value of each range or segment from the bitstream.

According to an embodiment, the method further comprises segmenting one or more available depth maps into a same number of regions as the number of said segments. An available depth map may be for example a reconstructed or decoded depth map of the same time instant or access unit, or a reconstructed or decoded depth map of the same view (as the depth map currently coded/decoded), or a depth map warped (e.g. with DIBR) into the viewpoint of the depth map currently coded/decoded. A representative value for each segment may be formed on the basis of the segmented one or more available depth map for example in one or more of the following ways. For example, the segments of the histogram sample values of the one or two reconstructed chroma sample arrays are compared with sample values of the regions of the depth maps, and using the sample values of the depth region covering (a.k.a. spatially overlapping) a majority of samples of a chroma sample array segment as the values of respective samples in said segment.

In other words, a value derived from (e.g. a mean or a median of) the depth map segment which covers the majority of the pixels in the chroma segment may be used as the representative value of respective pixels in the chroma segment.

According to an embodiment, one or two chroma sample arrays of an earlier reconstructed/decoded texture view component is segmented e.g. as presented above. In a first example, when the current depth view component being coded/decoded is for a non-base view, an earlier reconstructed/decoded texture view component may be the reconstructed/decoded texture view component of the base view for the same time instant or access unit as that of the current depth view component. In a second example, when the current depth view component being coded/decoded is for the base view, an earlier reconstructed/decoded texture view component may be the reconstructed/decoded texture view component of the base view for an earlier (in coding/decoding order) time instant or access unit as that of the current depth view component. For each segment, the of an earlier reconstructed/decoded texture view component, a representative value is obtained on the basis of collocated sample values of the reconstructed/decoded depth view component that corresponds to the earlier reconstructed/decoded texture view component. Here, the corresponding reconstructed/decoded depth view component represents the same time instant or access unit and the same viewpoint as the earlier reconstructed/decoded texture view component. The selection of the earlier reconstructed/decoded texture view component may be pre-defined for example in a coding standard or alternatively may be indicated in a bitstream by an encoder and/or decoded from a bitstream by a decoder. For example, the selection may be pre-defined to be based on the first example above for coding/decoding of non-base-view depth view components and on the second example above for coding/decoding of base-view depth view components. In another example, the encoder indicates within a bitstream and/or the decoder decodes from a bitstream whether the selection uses a method of the first example (or alike) or a method of the second example (or alike) when representative values for predicting non-base-view depth view components.

According to an embodiment, the method further comprises using a mean value or a median value of all samples in said region as the value of all samples in said segment. Thus, similar mean or median value utilization as described above for chroma sample value segments may be used for modifying pixel values of each region in depth map.

In some embodiments s described above including segmentation of reconstructured/decoded depth view components and/or uncompressed depth maps, a depth map segmentation as described above in connection with histogram segmentation may applied to the segmentation based on the location and/or type of contours.

According to an embodiment, the sample adaptive offset (SAO) tool of H.265/HEVC or a tool similar to SAO, jointly referred to as inter-layer SAO herein, is applied to process one or more chroma sample arrays to for a reference sample array for depth picture prediction. The band offset tool of SAO or a similar band offset tool enables to modify the sample values within a certain range (i.e. within a certain band). Particularly, an offset value is added to sample values within a certain range. Moreover, SAO parameters may be indicated on block-basis (e.g. per CTU in H.265/HEVC). Hence, the encoder can process chroma sample array(s) in a spatially adaptive manner so that the chroma sample array(s) become more uniform with the respective depth picture, i.e. the chroma values within an object having the same or similar depth value can be processed with SAO to become the same as or similar to each other.

An inter-layer SAO process may comprise for example one or more of the following steps:
 pre-defining, determining or obtaining degrees of adaptation for the inter-layer SAO process;
 pre-defining, determining or obtaining sequence-, picture- and/or slice-wise parameter values for the inter-layer SAO process;
 deriving bands to be filtered by the inter-layer SAO process for one or more blocks of said one or two reconstructed chroma sample arrays;
 determining (in an encoder) offsets for bands to be filtered;
 predicting offsets (in an encoder and/or decoder) for bands to be filtered;

encoding (in an encoder) a difference between a predicted offset and a determined offset;

decoding (in a decoder) an offset for a band to be filtered from the predicted offset and the decoded difference between the predicted offset and the determined offset.

In the following paragraphs, non-limiting example embodiments of inter-layer SAO are presented. Any combination of the example embodiments may be applied jointly with each other or independently of each other.

According to an embodiment, one or more of the following the degrees of adapting inter-layer SAO may be pre-defined for example in a coding standard or alternatively determined and indicated in a bitstream by an encoder and/or decoded from a bitstream by a decoder. The degrees of adapting may for example include but are not limited to one or more of the following:

whether the bands to be processed by the inter-layer SAO process are contiguous, i.e. next to each other;

whether the bands to be processed by the inter-layer SAO process have a constant size (e.g. in all bitstreams conforming to a coding standard or within the pictures which the encoded indication pertains to, such as within the coded video sequence when an indication is included in a VPS);

whether the blocks for which the parameters of the inter-layer SAO process are indicated by an encoder in a bitstream and/or decoded by the decoder from a bitstream have a constant size (e.g. in all bitstreams conforming to a coding standard or within the pictures which the encoded indication pertains to, such as within the coded video sequence when an indication is included in a VPS).

According to an embodiment, depending on the degrees of adapting inter-layer SAO, one or more of the following parameters for inter-layer SAO may be pre-defined for example in a coding standard or alternatively determined and subsequently indicated in a bitstream by an encoder and/or decoded from a bitstream by a decoder:

the number of bands to be processed by the inter-layer SAO process an initial band interval to be used in the inter-layer SAO process the block size for the inter-layer SAO process In an embodiment, the encoding method and/or the decoding method comprises the following band determination process for the inter-layer SAO process:

A pre-defined or determined number of bands (denoted targetNum) with the most number of samples (of said one or two reconstructed chroma sample arrays) with the pre-defined or determined initial band offset interval is derived.

If there are fewer than targetNum bands with samples, split each band interval of those bands with samples into two intervals.

Repeat the process of finding targetNum bands with most number of samples. Again, if there are fewer than targetNum bands with samples, split each band interval with samples into two intervals (of equal size).

Repeat such process of splitting the band intervals and finding targetNum bands with the most number of samples until there are at least targetNum bands with samples or until the band offset interval of all bands with samples is of size 1 and no further splitting is therefore possible.

In an embodiment, the encoding method and/or the decoding method comprises the following band determination process for the inter-layer SAO process:

Derive a pre-defined or determined number of bands (denoted targetNum) bands with the most number of samples with the pre-defined or determined initial band offset interval.

As long as there are fewer than targetNum bands with samples and among them there are bands wider than one sample value, split the band interval (wider than one sample value) with the greatest number of samples into two intervals (of equal size).

In an embodiment, the block size to be used in the inter-layer SAO process may be adaptively determined in combination of determining the bands e.g. starting from a largest block size, such as 64×64. For example, the following process may be used:

A pre-defined or determined number of bands (denoted targetNum) with the most number of samples (of said one or two reconstructed chroma sample arrays) with the pre-defined or determined initial band offset interval is derived.

If there are fewer than targetNum bands with samples, split each band interval of those bands with samples into two intervals.

Repeat the process of finding targetNum bands with most number of samples. Again, if there are fewer than targetNum bands with samples, split each band interval with samples into two intervals (of equal size).

Repeat such process of splitting the band intervals and finding targetNum bands with the most number of samples until there are at least targetNum bands with samples or until the band offset interval of all bands with samples is of size 1 and no further splitting is therefore possible.

If a previous iteration round resulted into fewer than targetNum bands with samples and this iteration resulted into more than targetNum bands with samples, derive the band offsets for both band offset intervals (separately) and choose in the encoder the band offset interval that results into a smaller distortion (sum of absolute differences between the processed block and the collocated original depth block). The encoder may encode this selection into the bitstream and the decoder may decode this selection from the bitstream.

If the current block size is greater than a pre-defined or determined minimum size and the share of samples for which the sample-wise absolute difference between the processed block and the original depth picture is greater than TH1 is greater than TH2, split the block into four equal-size blocks (e.g. split 64×64 block to four 32×32 blocks) and repeat the process above.

TH1 is selected to catch samples which the inter-layer SAO process maps wrongly. TH1 may be pre-defined in a coding standard or selected by the encoder.

Likewise, TH2 may be pre-defined in a coding standard or selected by the encoder.

The encoder may encode the information on the split blocks into the bitstream and the decoder may decode the information on the split blocks from the bitstream.

In an embodiment, predicting offsets (in an encoder and/or decoder) for bands to be filtered may be performed as follows:

For each horizontal block position x, maintain the band interval (intervalStart[x][i] and intervalEnd[x][i]) processed by the inter-layer SAO process and the SAO offset value for each interval (offset[x][i]), where i is an index of the interval from 0 to number of processed bands−1, inclusive. E.g. if the image width is 960 and inter-layer SAO block size of 64 is used, the horizontal block position is within the range of 0 to 14 (=960/64), inclusive. Whenever a block is processed by the inter-layer SAO process at horizontal block position x, overwrite the previous values of intervalStart[x][i], intervalEnd[x][i] and offset[x][i].

Maintain a 256-entry array of offset values, latestOffset [cVal] (assuming 8-bit chroma sample values—the dimension of the array could be scaled similarly for other bit-depths of the chroma sample array). The decoded chroma value is used an array offset. When a block has been processed by the inter-layer SAO process, update the latestOffset for each cVal in the range of intervalStart[x][i] to intervalEnd[x][i], inclusive, to be equal to offset[x][i] (for all values of i). In other words, latestOffset[cVal] provides the previous offset value, in reverse raster scan order, of each chroma sample value.

For each block to be processed by the inter-layer SAO process, use any above embodiment or alike to select the bands to be processed and their offsets.

Predicting an offset, denoted predOffset, on the basis the determined bands and earlier offsets, such as offsets of spatially neighboring blocks. A non-limiting example of deriving predOffset is provided below, from which all or a subset of steps may be included and the order of steps may also differ from that presented below. Note that currIntervalStart, currIntervalEnd and currOffset also need to be indexed [j] as the their values are used to update intervalStart, intervalEnd, offset, and latestOffset after all bands of the block have been processed, but for simplicity no index is used in the description below.

If the same band is available in the left side, i.e. if intervalStart[x−1][i]==currIntervalStart and intervalEnd[x−1][i]==currIntervalEnd (for any value of i), then derive predOffset=offset[x−1][i].

Else if the same band is available in the above side, i.e. if intervalStart[x][i]==currIntervalStart and intervalEnd[x][i]==currIntervalEnd (for any value of i), then derive predOffset=offset[x][i].

Else if the same band is fully covered by another band in the left side, i.e. if intervalStart[x−1][i]<=currIntervalStart and intervalEnd[x−1][i]>=currIntervalEnd (for any value of i), then derive predOffset=offset[x−1][i].

Else if the same band is fully covered by another band in the above side, i.e. if intervalStart[x][i]<=currIntervalStart and intervalEnd[x][i]>=currIntervalEnd (for any value of i), then derive predOffset=offset[x][i].

Else if the same band is fully covered by a set of bands in the left side, i.e. if intervalStart[x−1][i]<=currIntervalStart and intervalEnd[x−1][j]>=currIntervalEnd (for values of i and j for which the respective bands i . . . j cover a contiguous value range, i.e. each value from currIntervalStart to currIntervalEnd), then derive the average offset value, avgOffset, in the bands in the left side within the band interval of the current processed band and derive predOffset=avgOffset.

Else if the same band is fully covered by a set of bands in the above side, i.e. if intervalStart[x][i]<=currIntervalStart and intervalEnd[x][j]>=currIntervalEnd (for values of i and j for which the respective bands i . . . j cover a contiguous value range), then derive the average offset value, avgOffset, in the bands in the above side within the band interval of the current processed band and derive predOffset=avgOffset.

Else derive the average offset value, avgOffset, from latestOffset, within the current processed band. In other words, avgOffset=round(sum(latestOffset[currIntervalStart . . . currIntervalEnd])/(currIntervalEnd−currIntervalStart+1)) (where the division is a floating point division). Then derive predOffset=avgOffset.

In the encoder derive diffOffset=currOffset−predOffset, where currOffset is the offset for the band as determined by the any of the other embodiments. Then encode the diffOffset into the bitstream. For example, diffOffset may be used as a binarized codeword that is encoded with context-adaptive arithmetic coding, such as CABAC.

in the decoder, decode diffOffset from the bitstream. Then derive currOffset=predOffset+diffOffset, where currOffset is the offset to be used in the inter-layer SAO process.

After processing all bands of the current block, update intervalStart[x][i]=currIntervalStart[i], intervalEnd[x][i]=currIntervalEnd[i], offset[x][i]=currOffset[i] and update the latestOffset[cVal] according to the just processed bands.

Any embodiment described above may be applied on a combination of chroma components. This combination can be a mixture of U and V components requiring some complementary data to be transmitted informing the decoder about how to perform the merging process. Alternatively, the encoder can overlap U and V components and create a component with only common contours between U and V components. This will reduce the amount of contours in favour of very visible contours in texture components which, in general, may better present respective contours in depth maps.

The processed chroma sample array(s) may be used as a reference for prediction of a depth picture in a plurality of ways.

According to an embodiment, the method further comprises using said one or two reconstructed chroma sample arrays and/or one of said modified chroma sample arrays as a monochrome picture to be used as a reference for sample prediction of the depth view or certain depth picture(s) within the depth view. Thus, the reconstructed or processed chroma sample array may be considered as the luma sample array of a reference picture, which is used as a reference for sample prediction of the depth picture. Inter-layer or inter-view prediction may be applied conventionally with reference to the reconstructed or processed chroma sample array. For example, the reconstructed or processed chroma sample array may be inserted into an inter-layer reference picture set and/or one or more initial reference picture lists by the encoder and/or the decoder. When included in one or more initial reference picture lists, the reconstructed or processed chroma sample array may be regarded as a long-term reference picture, particularly when it comes to motion vector prediction using the reconstructed or processed chroma sample array as a reference for prediction, such as a collocated picture for TMVP of H.265/HEVC or its extensions.

According to an embodiment, the method further comprises using both of said reconstructed or modified chroma sample arrays as monochrome pictures to be used as a reference for sample prediction of the depth view. Also herein, inter-layer or inter-view prediction may be applied conventionally with reference to picture(s) containing the processed chroma sample array. Bi-prediction with a reference to one or both of the pictures with the reconstructed or processed chroma sample array may be used to form prediction blocks.

According to an embodiment, an encoder may indicate the inclusion of one or two reconstructed chroma sample arrays into an inter-layer reference picture set (RPS) of a depth picture (which may also be referred to as a depth view component). Likewise, a decoder may decode an inter-layer RPS of a depth picture and consequently include the one or two reconstructed chroma sample arrays in initial reference picture list(s). The encoder may indicate modification of the reference picture lists e.g. using a reference picture list modification (RPLM) syntax structure within a slice segment header, and the decoder may likewise decode the RPLM syntax structure to rearrange the initial reference picture list(s) in another order.

Figure 10B:
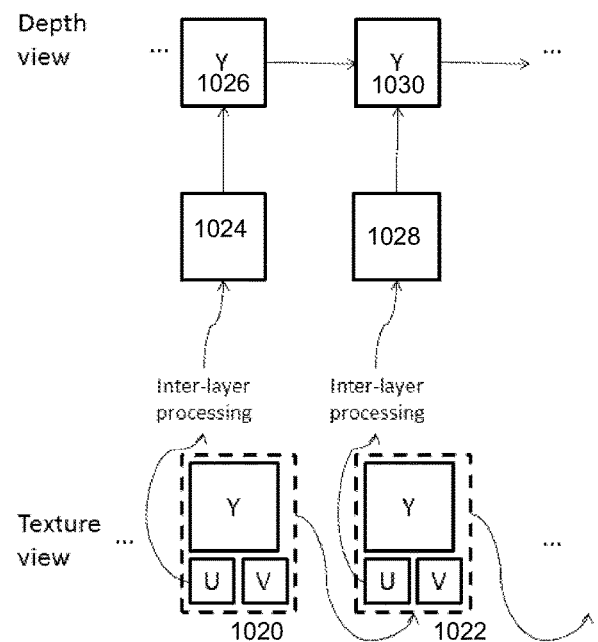
FIG. 10b illustrates an example where a horizontal scale factor and/or a vertical scale factor between depth pictures in a depth view and chroma sample arrays of pictures of a texture view is determined to be unequal to 1.
Figure 10C:
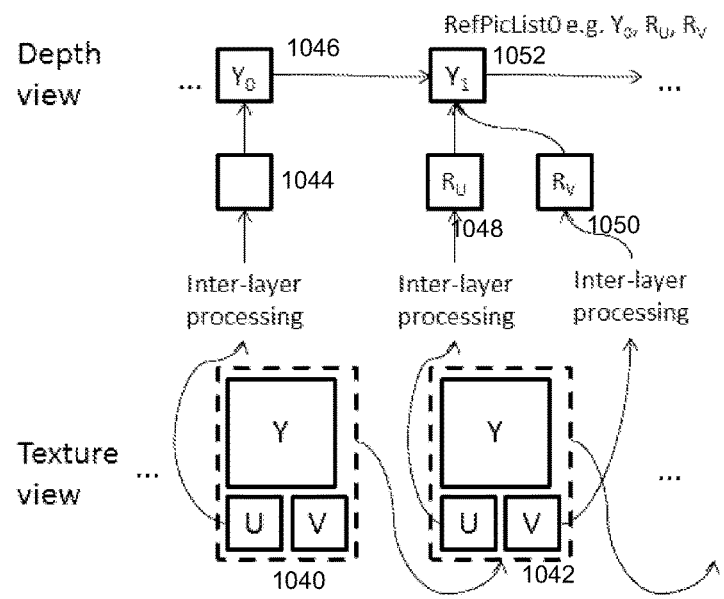
FIG. 10c illustrates an example where the encoder and/or the decoder has included two reconstructed chroma sample arrays into reference picture list 0 of a depth picture.

FIG. 10c illustrates an example where the encoder and/or the decoder has included two reconstructed (and possibly modified) chroma sample arrays (1048, 1050) into reference picture list 0 of a depth picture 1052. In addition the reference picture list 0 of the depth picture 1052 includes a reference to an earlier depth picture 1046.

According to an embodiment, the method further comprises including a picture containing a reconstructed or processed chroma sample array in a reference picture list more than once with different associated weighting parameters. The encoder may, for example, derive a first set of weighting parameters that suit particular objects and/or areas of the picture (to make the reconstructed or processed chroma sample array within these object or areas more uniform with the depth picture) and a second set of weighting parameters that suit certain other objects and/or areas of the picture similarly. The encoder may associate and indicate in the bitstream that the first set of weighting parameters is associated with a first occurrence of the picture or a first reference index (pointing to the picture) within the reference picture list and that the second set of weighting parameters is associated with a second occurrence of the picture or to second reference index (pointing to the picture) within the reference picture list. The encoder may then refer (and indicate in the bitstream the reference to) the first reference index (or alike) when predicting the objects and/or areas and refer (and indicate in the bitstream the reference to) the second set reference index (or alike) when predicting the other objects and/or areas. The decoder may decode these indications from the bitstream and hence use the weighting parameters in generating the reference blocks identically compared to the encoder.

A motion field may be derived for the reconstructed or processed chroma sample arrays. According to an embodiment, the motion field is derived only if it is or may be used as reference for motion prediction, for example by assigning the picture of the processed chroma sample arrays as a collocated picture for TMVP of H.265/HEVC or its extensions.

According to an embodiment which may be applied independently of or together with other embodiments, the encoder may indicate in the bitstream, for example in a sequence-level syntax structure such as VPS, SPS, and/or VUI, if pictures including reconstructed or processed chroma sample arrays may be used as a reference for motion prediction or that pictures including reconstructed or processed chroma sample arrays are not used as a reference for motion prediction.

The sequence-wise indication may apply for all the pictures or access units for which the sequence-level syntax structure is active or valid. In some embodiments, the sequence-wise indication may be specifically indicated to be specific to one or more indicated layers and/or one or more indicated pairs of a layer containing depth pictures and its reference layers. In some embodiments, the sequence-wise indication may be specific to certain picture type or types and/or VCL NAL unit type or types, such as IRAP pictures. In some embodiments, the sequence-wise indication may be specific to certain sub-layer(s) or TemporalId value(s). In some embodiments, the sequence-wise indication may be specific to non-reference pictures, sub-layer non-reference pictures, and/or reference pictures. In some embodiments, there are more than one sequence-wise indications, each of which may be specific to a certain combination of one or more properties above and/or one or more values of one or more properties above. For example, a sequence-wise indication may be specific to sub-layer non-reference pictures at indicated layers.

In some embodiments, a sequence-level syntax structure, such as VPS, may specify dependencies between layers and, if a pair of layers depend on each other, prediction type between the layers. The prediction type may for example include inter-layer sample prediction and inter-layer motion prediction. In some embodiments, it may be concluded by the encoder and/or the decoder that when inter-layer sample prediction is indicated from a texture view to a depth view (or an auxiliary picture layer), chroma sample arrays of the decoded pictures of the texture view, either with or without modification, are used as reference for inter-layer prediction of the depth view.

In some embodiments, the encoder indicates in an access unit or a coded depth picture if the picture containing the one or more reconstructed or processed chroma sample array(s) is or may be used as a reference for motion prediction. For example, the encoder may set the syntax elements collocated_from_l0_flag (if present) and collocated_ref_idx of H.265/HEVC or its extensions in the slice header(s) of the depth picture to indicate that the inter-layer reference picture, e.g. the texture picture of the same viewpoint, is used as a reference for TMVP.

In some embodiments, the decoder decodes one or more of the indication(s) mentioned above to conclude whether a picture containing reconstructed or processed chroma sample array(s) is or may be used as a reference for motion prediction of a depth picture. If a picture containing reconstructed or processed chroma sample array(s) is or may be used as a reference for motion prediction of a depth picture, the decoder may derive a motion field for the picture.

The motion field may be derived for the reconstructed or processed chroma sample arrays, for example, from the motion field (here, a second motion field) of the picture containing the chroma sample array(s) prior to their processing. The motion vectors of the second motion field may be scaled proportionally to the spatial dimensions of the depth picture and the spatial dimensions of the picture or sample array associated with the second motion field. For example, the second motion field may be associated with the luma sample array of a picture, and this luma sample array may have twice the number of samples both horizontally and vertically compared to the depth picture. In this example, the horizontal and vertical components of the motion vectors in the second motion field may be halved to form a motion field for the reconstructed or processed chroma sample arrays.

In some embodiments, the encoder uses the reconstructed or processed chroma sample arrays as a reference for prediction and applies conventional prediction error or residual coding, which may be based on transforming and quantizing residual blocks. The decoder may dequantize and inverse-transform the coded residual blocks to obtain a decoded prediction error block, which may then be summed up (sample-wise) with a prediction block originating from one or more reference pictures containing reconstructed or processed chroma sample arrays.

The chroma sample array(s) used for generating a reference picture for a depth picture may be referred to as the seed chroma sample array(s).

According to an embodiment, the reconstructed/decoded depth picture may be used as reference for texture picture prediction.

In some embodiments, the seed chroma sample array(s) may be coded separately from the luma sample array and the non-seed chroma sample array (if any). If there is only one seed chroma sample array for a texture picture, it may be coded using separate color plane syntax of the coding scheme or standard, i.e. as a monochrome picture. If there are two seed chroma sample arrays for a texture picture, each of them may be coded using separate color plane syntax of the coding scheme or standard, i.e. as a monochrome picture. Alternatively, the two seed chroma sample arrays may be coded jointly into one coded picture, where the U and V data are interleaved.

The depth picture may be (de)coded prior to the (de)coding of the luma sample array and/or the non-seed chroma sample array (if any). The reconstructed or decoded depth picture may be used for depth-based coding tools for (de)coding of the luma sample array and/or the non-seed chroma sample array (if any). For example, the reconstructed or decoded depth picture may be used for disparity vector derivation, depth-based motion vector prediction and/or view synthesis prediction.

If there are no non-seed chroma sample arrays, the luma sample array of the texture picture may be coded using separate color plane syntax of the coding scheme or standard, i.e. as a monochrome picture. Otherwise, each of the luma sample array and the non-seed chroma sample array may be coded using separate color plane syntax of the coding scheme or standard, i.e. as a monochrome picture. Alternatively, the luma sample array and the non-seed chroma sample array may be coded jointly into one coded picture, where the luma and non-seed chroma data are interleaved.

The method can be implemented in multiple ways. For example, in some embodiments, instead of or in addition to forming a reference picture for predicting a depth picture, the same reference picture may be used for predicting a picture of another type. For example, the reference picture may be used for predicting an alpha plane representing transparency.

In some embodiments, instead of or in addition to forming a reference picture for predicting a depth picture, the same method for processing one or more chroma sample arrays may be applied for creating a reference picture for predicting a picture of another type. The parameters and/or parameter values controlling the processing may differ from those used to form a reference picture for predicting a depth picture.

In some embodiments, the method to process one or more chroma sample arrays may be specified as an inter-layer process that is used to create an inter-layer reference picture (or sample array(s) of an inter-layer reference picture). Other than the inter-layer process and parameters controlling the inter-layer processing, the (de)coding scheme may remain the same as or similar to the respective single-layer (de)coding scheme and/or a scalable (de)coding scheme that is based on high-level changes to a single-layer (de)coding scheme.

According to an embodiment, the encoding method further comprises modifying uncompressed depth pictures prior to encoding them. This embodiment may be based on a rate-distortion-optimization (RDO) algorithm, which may apply to coded views and/or selected synthesized views. Depth values of uncompressed depth pictures may be modified to provide such that a better RD performance is obtained when depth pictures are predicted from chroma sample arrays of texture pictures according to one or more other embodiments.

In an embodiment which may be applied independently of other embodiments, one or both of the chroma components of a reconstructed/decoded texture picture are processed with a segmentation process. The (de)coding process of a depth picture is at least partly based on the segments derived in the segmentation process. For example, a single depth sample value may be (de)coded for each segment in raster scan order of the first sample position of each segment in raster scan order. In other words, the depth picture is at least partly coded using segment-based coding. The described embodiment may comprise the following steps:

1. One or both of the reconstructed/decoded chroma sample arrays of a texture view component are processed to obtain segmentation (a mapping of sample locations to segments). Any segmentation method may be used in this phase.
2. The encoder may compare the obtained segment boundaries to the original depth view component. Consequently, the encoder may refine the segmentation and encode refinement information into the bitstream. Likewise, the decoder may decode refinement information from the bitstream and refine the segmentation accordingly.
3. The encoder may use the segmentation to pre-process original depth view components. For example, the average depth value for each segment may be computed.
4. The encoder may encode a depth view component (which may have been pre-processed in step 3) on segment basis. Likewise, the decoder may decode a depth view component from the bitstream on segment basis. For example, a single depth value per segment may be (de)coded for each segment in raster scan order of the first sample position of each segment in raster scan order.
5. In some embodiments, the encoder may additionally encode a prediction error or residual signal into a bitstream (e.g. as part of a coded depth view component) and the decoder may additionally decode a prediction error or residual signal from the bitstream. The encoder and/or the decoder may sum up the reconstructed/decoded prediction error or residual signal to the depth view component reconstructed/decoded on segment basis to form a final reconstructed/decoded depth view component. The prediction error or residual signal may be (de)coded block-wise within a slice or a picture, for example, or may be (de)coded block-wise within each segment, for example.

In phase 2 above, the segmentation may be compared to the uncompressed depth map available in the encoder. In a first example depth edges may be derived from the uncompressed depth map, e.g. using a Sobel filter, and the location of the depth edges may be compared to location of segment boundaries. In a second example, a sample-wise error between a uncompressed depth sample located on the boundary of a segment may be compared to the reconstructed/decoded representation of the sample. The same may be repeated assuming that the sample would belong to the adjacent segment. If the sample-wise error is smaller when the sample is classified to belong to the adjacent segment, the segment boundary may be refined accordingly. The encoder may encode segment boundary refinement information into the bitstream and the decoder may decode segment boundary refinement information from the bitstream.

In phase 3 above, the uncompressed depth maps available in encoder may be segmented using the generated contours from segmenting the chroma components. The values in each segment of the segmented depth map are considered as a reference to be processed. If we consider $Seg_i$ where $1 \leq i \leq N$ to include all pixel values of the $i^{th}$ segment in the segmented depth map, then $Seg_i$ is used to fill the respective segment in the segmented chroma component. Typically one value will be calculated based on the $Seg_i$ and this value ($Chroma_i$) replaces all pixel values in the respective segment in the segmented chroma component. For example, one of the following methods may be used to calculate the target value ($Chroma_i$) for $Seg_i$:

$Chroma_i = mean(Seg_i)$  1)

$Chroma_i = median(Seg_i)$  2)

$Chroma_i = max(Seg_i)$  3)

$Chroma_i = average(X_k)$, where $X_k$=pixels in $Seg_i$ with values≥mean(Seg)  4)

$Chroma_i = average(X_k)$, where $X_k$=pixels in $Seg_i$ with values≥median($Seg_i$)  5)

In phase 4 above, the encoder may encode a first depth view component into the bitstream and the decoder may decode a first depth view component from the bitstream based on the segmentation. The reconstructed/decoded first depth view component may be used as such for depth-based coding tools and/or as output from the encoder/decoder. Alternatively, the reconstructed/decoded first depth view component may be further refined (e.g. as in phase 5) and hence may be considered as a reference for prediction. In some embodiments, the first depth view component may be reconstructed/decoded step-wise (e.g. block-wise or segment-wise) and/or on the basis of referring to it in prediction processes.

Example embodiments of segment-based coding/decoding are described in this paragraph. A depth map preprocessed to contain one depth value per segment as described in the example of phase 3 may be coded/decoded in one or more of the following ways. In a first example, the depth values of each segment may be (de)coded with a fixed-length code (e.g. 8-bit unsigned integer) in raster scan order (as described earlier). In a second example, the average depth value of the depth values of each segment may be derived by the encoder and coded into the bitstream e.g. as a fixed-length code. A differential value is computed by the encoder for each segment as the difference between the depth value of the segment and the average depth value of all segments, and this differential value may be encoded into the bitstream e.g. as a variable-length code such as an exp-Golomb code representing a signed integer, i.e. as a se(v) codeword using the notation of ITU-T H.264 and H.265 standards. The decoder may correspondingly decode the average depth value from the bitstream and form the depth values for each segment by summing up the average depth value and the decoded differential value of the segment. In a third example, context-based entropy coding, such as context-adaptive binary arithmetic coding (CABAC) is used. The context for a segment may comprise the depth values of the adjacent segments that precede in (de)coding order. Depth values for each segment may be binarized in different ways, including but not limited to the methods of the first example and the second example.

In some embodiments, depth values may be quantized during the encoding process or as pre-processing for encoding. For example, it may be sufficient to use 64 depth levels rather than 256 (used by default in 8-bit-per-sample coding). The number of used depth levels may be indicated in the bitstream by the encoder and decoded from the bitstream by the decoder. The length and/or valid/allowable value ranges of certain codewords and/or binarized parameters (for entropy encoding/decoding) may depend on the number of used depth levels, e.g. when fixed-length codes is used above.

A sample array may be reconstructed by the encoder and/or decoded by the decoder on the basis of segment-based encoding/decoding. For example, in the reconstruction/decoding process, the sample locations of each segment is filled with its associated depth value, which may be coded/decoded for example in one of the ways described above. This sample array may be regarded as the seed sample array or the processed chroma sample array in the following.

In phase 5 above, residual signal may be encoded into the bitstream and decoded from the bitstream. One method is to use the seed sample array reconstructed/decoded according to steps 1 to 4 above as a reference for sample prediction of the depth picture.

In some embodiments, the encoder and/or the decoder may derive a horizontal scale factor (e.g. stored in variable ScaleFactorX) and/or a vertical scale factor (e.g. stored in variable ScaleFactorY) for depth pictures in a depth view and chroma pictures of a texture view for example based on the scaled reference layer offsets indicated between the depth view and the texture view. The scale factors may be considered to indicate the resampling factor between depth pictures and the chroma sample arrays of the texture pictures used as reference for predicting the depth pictures. If either or both the horizontal scale factor and the vertical scale factor is not equal to 1, said one or two reconstructed chroma sample array(s) may be resampled, where the resampling may be considered an inter-layer process or a part of an inter-layer process. Said resampling may be performed similarly to resampling for conventional spatial scalability or conventional extended scalability, for which some examples have been presented earlier. The resampling process and/or filter may be pre-defined e.g. in a coding standard, or the resampling process and/or filter may be indicated by the encoder in the bitstream (e.g. as an index among pre-defined resampling processes or filters) and/or decoded by the decoder from the bitstream. For example, it may be pre-defined e.g. in a coding standard that a conventional chroma resampling process (e.g. the chroma resampling process as described earlier) may be used when resampling a chroma sample array for predicting a depth picture. In another example, an index indicating whether a conventional luma resampling process (e.g. the luma resampling process as described earlier) or a conventional chroma resampling process is encoded into the bitstream by the encoder and/or decoded from the bitstream by the decoder.

FIG. 10b illustrates an example where a horizontal scale factor and/or a vertical scale factor between depth pictures (1026 and 1030) in a depth view and chroma sample arrays of pictures (1020 and 1022) of a texture view is determined to be unequal to 1. The chroma sample arrays are resampled as part of inter-layer processing, possibly among other types of inter-layer processing, and the resulting reference sample arrays (1024 and 1028, respectively) are used for predicting the sample arrays of the respective depth pictures (1026 and 1030, respectively) of the depth view. For example, the depth sample array 1030 is predicted from the reference sample array 1028, which is created by resampling the U sample array of texture picture 1022 and possibly additionally modifying, using one or more of the embodiments of the invention, the U sample array, either in its original resolution or in its resampled resolution, of the texture picture 1022. The depth picture or depth sample array 1030 may additionally be predicted from earlier depth pictures or depth sample arrays, such as 1026.

It needs to be understood that the resampling process and/or filter for resampling a reconstructed chroma sample array to be used as reference for prediction for a depth picture need not be limited to linear filtering but various non-linear filtering methods may be used instead or additionally.

In some embodiments, a reconstructed and possibly resampled chroma sample array and a respective depth view component need not be completely overlapping or collocated. Modification or processing of the reconstructed (and possibly resampled) chroma sample array may be limited to an area that collocates with the respective depth view component. The use of the reconstructed/modified (and possibly resampled) chroma sample array for prediction may be disabled by the encoder and/or the decoder for areas in the depth view component for which there is no collocating sample data in the reconstructed/modified (and possibly resampled) chroma sample array. Alternatively or in addition, the modification of a reconstructed (and possibly resampled) chroma sample array may include padding, extrapolation or alike to obtain collocated samples for the depth view component being predicted. In some embodiments, the padding, extrapolation or alike is handled as part of the resampling process in a way that the sample values selected to be filtered are repeated at the edge of a reference layer picture or the upsampled region of the reference layer picture. In some embodiments, the padding, extrapolation or alike is handled as part of the process of accessing samples from the reference picture. For example, the coordinates used to access a reference picture may be clipped or saturated so that only samples that collocate with the depth view component are used from the reference picture.

In some embodiments, more than one type of modification may be applied the chroma sample array, such as sample value quantization, sample value weighting, sample adaptive offset and/or different segmentation based modifications. The order of applying the modifications may be pre-defined e.g. in a coding standard or it may be indicated in the bitstream by the encoder and/or decoded from the bitstream by the decoder.

In some embodiments, the order of resampling and/or padding with respect to one or more modification processes may be pre-defined e.g. in a coding standard or it may be indicated in the bitstream by the encoder and/or decoded from the bitstream by the decoder. For example, resampling and padding may be performed prior to any modification process. In another example, resampling and padding may be performed subsequent to all modification processes.

While many of the embodiments are described as sample array wise operation, it needs to be understood that embodiments could similarly be realized with block-wise operation. A decoder may for example operate on prediction unit basis when decoding a depth view component. If a PU predicts from a processed chroma sample array, the processing or modification of the chroma sample array may be performed block-wise such that a prediction for the PU is formed but an entire chroma sample array is not processed.

Figure 11:
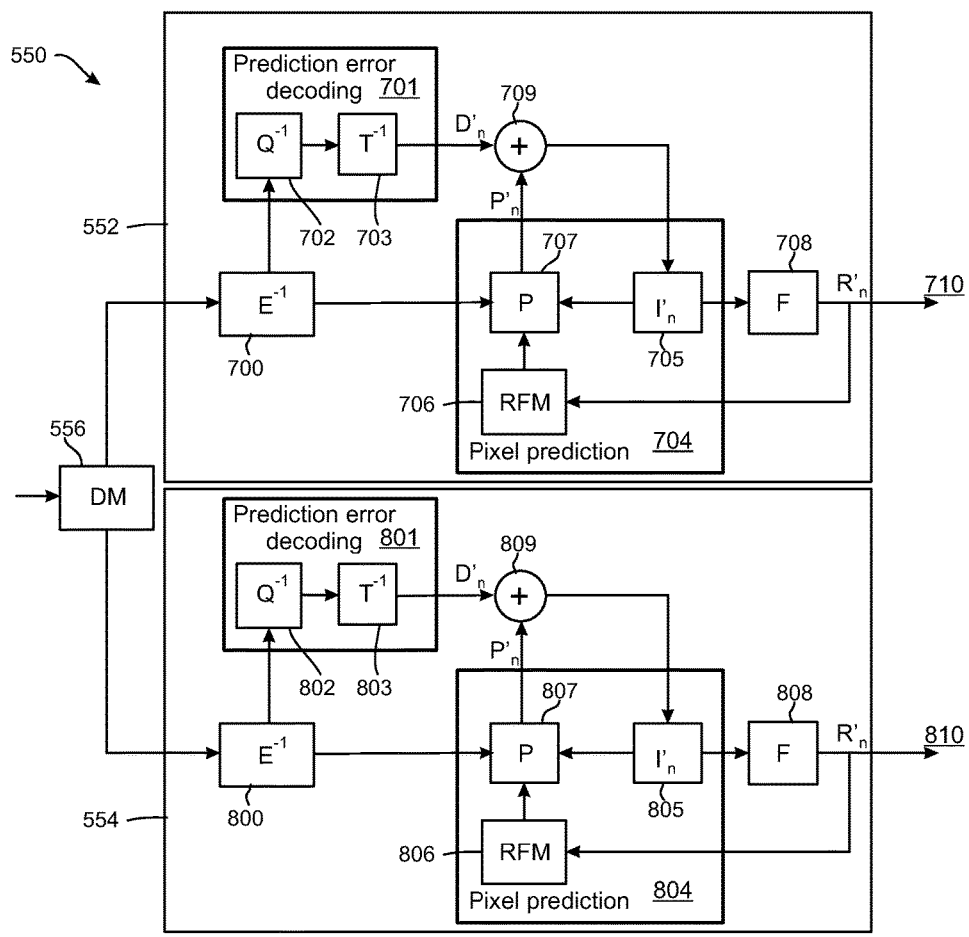
FIG. 11 shows a schematic diagram of a decoder suitable for implementing some embodiments of the invention.

FIG. 11 shows a block diagram of a video decoder suitable for employing embodiments of the invention. FIG. 11 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   obtaining a depth view component map;
   decoding one or both chroma components of a coded texture picture into one or two decoded chroma sample arrays;
   obtaining a reference sample array on the basis of said one or two decoded chroma sample arrays by modifying said one or two decoded chroma sample arrays, said modifying comprising:
   segmenting said one or two decoded chroma sample arrays, wherein said segmenting comprises creating a histogram of sample values of said one or two decoded chroma sample arrays;
   replacing the sample values in each segment by a representative value of said each segment wherein the representative value is derived from comparing segments of the histogram sample values of said one or two decoded chroma sample arrays with sample values of one or more regions of the depth map and using the sample values of the depth region spatially overlapping a majority of samples of a chroma sample array segment as the values of respective samples in each segment; and
   forming a decoded depth view component on the basis of said reference sample array.

2. The method according to claim 1, the method further comprising
   modifying said one or two decoded chroma sample arrays in order to obtain the reference sample array, said modifying comprising
   partitioning said one or two decoded chroma sample arrays into blocks to be filtered;
   deriving bands of sample values to be filtered for each block;

decoding an offset for each band and each block to be filtered; and summing each sample value of a block to be filtered and the offset for the band for said each sample value.

3. The method according to claim 1, the method further comprising using at least one of said modified chroma sample arrays as a monochrome picture to be used as a reference for sample prediction of the depth view.

4. The method according to claim 1, the method further comprising including a picture containing a processed chroma sample array in a reference picture list more than once with different associated weighting parameters.

5. An apparatus comprising:

at least one processor and at least one memory, said at least one memory stored with code thereon, which when executed by said at least one processor, causes an apparatus to perform at least:

obtaining a depth map;

decoding one or both chroma components of a coded texture picture into one or two decoded chroma sample arrays;

obtaining a reference sample array on the basis of said one or two decoded chroma sample arrays by modifying said one or two decoded chroma sample arrays in, said modifying comprising:

segmenting said one or two decoded chroma sample arrays, wherein said segmenting comprises creating a histogram of sample values of said one or two decoded chroma sample arrays; and replacing the sample values in each segment by a representative value of said each segment, wherein the representative value is derived from comparing segments of the histogram sample values of said one or two decoded chroma sample arrays with sample values of one or more regions of the depth map and using the sample values of the depth region spatially overlapping a majority of samples of a chroma sample array segment as the values of respective samples in each segment; and forming a decoded depth view component on the basis of said reference sample array.

6. The apparatus according to claim 5, further comprising code, which when executed by said at least one processor, causes an apparatus to perform modifying said one or two decoded chroma sample arrays in order to obtain the reference sample array, said modifying comprising partitioning said one or two decoded chroma sample arrays into blocks to be filtered;

deriving bands of sample values to be filtered for each block;

decoding an offset for each band and each block to be filtered; and summing each sample value of a block to be filtered and the offset for the band for said each sample value.

7. The apparatus according to claim 5, further comprising code, which when executed by said at least one processor, causes an apparatus to perform using at least one of said modified chroma sample arrays as a monochrome picture to be used as a reference for sample prediction of the depth view.

8. The apparatus according to claim 5, further comprising code, which when executed by said at least one processor, causes an apparatus to perform including a picture containing a processed chroma sample array in a reference picture list more than once with different associated weighting parameters.

9. A computer program product embodied on a non-transitory computer readable storage medium, comprising program code configured to, which when executed by a processor, causes an apparatus to perform:

obtaining a depth map;

decoding one or both chroma components of a coded texture picture into one or two decoded chroma sample arrays;

obtaining a reference sample array on the basis of said one or two decoded chroma sample arrays by modifying said one or two decoded chroma sample arrays, said modifying comprising:

segmenting said one or two decoded chroma sample arrays, wherein said segmenting comprises creating a histogram of sample values of said one or two decoded chroma sample arrays; and replacing the sample values in each segment by a representative value of said each segment, wherein the representative value is derived from comparing segments of the histogram sample values of said one or two decoded chroma sample arrays with sample values of one or more regions of the depth map and using the sample values of the depth region spatially overlapping a majority of samples of a chroma sample array segment as the values of respective samples in each segment; and forming a decoded depth view component on the basis of said reference sample array.

10. A method comprising:

encoding one or two chroma components of a texture picture into one or two coded chroma components and reconstructing one or two reconstructed chroma sample arrays;

obtaining a reference sample array on the basis of modifying said one or two reconstructed chroma sample arrays, said modifying comprising segmenting said one or two reconstructed chroma sample arrays by creating a histogram of sample values of said one or two reconstructed chroma sample arrays and comparing segments of the histogram sample values of said one or two decoded chroma sample arrays with sample values of one or more regions of a depth map and using the sample values of the depth region spatially overlapping a majority of samples of a chroma sample array segment as the values of respective samples in each segment; and using the reference sample array as a reference for prediction in encoding of a depth view component.

11. The method according to claim 10, the method further comprising modifying said one or two reconstructed chroma sample arrays in order to obtain the reference sample array, said modifying comprising partitioning said one or two reconstructed chroma sample arrays into blocks to be filtered;

deriving bands of sample values to be filtered for each block;

encoding an offset for each band and each block to be filtered; and summing each sample value of a block to be filtered and the offset for the band for said each sample value.

12. The method according to claim 11, the method further comprising
    using at least one of said modified chroma sample arrays as a monochrome picture to be used as a reference for sample prediction of the depth view.

13. The method according to claim 10, the method further comprising
    including a picture containing a processed chroma sample array in a reference picture list more than once with different associated weighting parameters.

14. An apparatus comprising:
    at least one processor and at least one memory, said at least one memory stored with code thereon, which when executed by said at least one processor, causes an apparatus to perform at least:
    encoding one or two chroma components of a texture picture into one or two coded chroma components and reconstructing one or two reconstructed chroma sample arrays;
    obtaining a reference sample array on the basis of modifying said one or two reconstructed chroma sample arrays, said modifying comprising segmenting said one or two reconstructed chroma sample arrays by creating a histogram of sample values of said one or two reconstructed chroma sample arrays and comparing segments of the histogram sample values of said one or two decoded chroma sample arrays with sample values of one or more regions of a depth map and using the sample values of the depth region spatially overlapping a majority of samples of a chroma sample array segment as the values of respective samples in each segment; and
    using the reference sample array as a reference for prediction in encoding of a depth view component.

15. The apparatus according to claim 14, further comprising code, which when executed by said at least one processor, causes the apparatus to perform:
    modifying said one or two reconstructed chroma sample arrays in order to obtain the reference sample array, said modifying comprising
    partitioning said one or two reconstructed chroma sample arrays into blocks to be filtered;
    deriving bands of sample values to be filtered for each block;
    encoding an offset for each band and each block to be filtered; and
    summing each sample value of a block to be filtered and the offset for the band for said each sample value.

16. The apparatus according to claim 14, further comprising code, which when executed by said at least one processor, causes the apparatus to perform
    using at least one of said modified chroma sample arrays as a monochrome picture to be used as a reference for sample prediction of the depth view.

17. The apparatus according to claim 14, further comprising code, which when executed by said at least one processor, causes the apparatus to perform
    including a picture containing a processed chroma sample array in a reference picture list more than once with different associated weighting parameters.

18. A computer program product embodied on a non-transitory computer readable storage medium configured to, when executed by a processor, cause an apparatus to perform:
    encoding one or two chroma components of a texture picture into one or two coded chroma components and reconstructing one or two reconstructed chroma sample arrays;
    obtaining a reference sample array on the basis of modifying said one or two reconstructed chroma sample arrays, said modifying comprising segmenting said one or two reconstructed chroma sample arrays by creating a histogram of sample values of said one or two reconstructed chroma sample arrays and comparing segments of the histogram sample values of said one or two decoded chroma sample arrays with sample values of one or more regions of a depth map and using the sample values of the depth region spatially overlapping a majority of samples of a chroma sample array segment as the values of respective samples in each segment; and
    using the reference sample array as a reference for prediction in encoding of a depth view component.

* * * * *